US008139117B2

(12) United States Patent  (10) Patent No.: US 8,139,117 B2
Dwinell et al. (45) Date of Patent: Mar. 20, 2012

(54) IMAGE QUALITY ANALYSIS WITH TEST PATTERN

(75) Inventors: John Dwinell, Wrentham, MA (US); Long Xiang Bian, Sharon, MA (US)

(73) Assignee: Sick, Inc., Minneapolis, MN (US)

( * ) Notice: Subject to any disclaimer, the term of this patent is extended or adjusted under 35 U.S.C. 154(b) by 820 days.

(21) Appl. No.: 11/788,821

(22) Filed: Apr. 20, 2007

(65) Prior Publication Data

US 2007/0285537 A1 Dec. 13, 2007

Related U.S. Application Data

(60) Provisional application No. 60/794,007, filed on Apr. 21, 2006.

(51) Int. Cl.
*H04N 7/18* (2006.01)
*H04N 17/00* (2006.01)
(52) U.S. Cl. ........................................ 348/188; 348/135
(58) Field of Classification Search .................. 348/188, 348/135.136, 137
See application file for complete search history.

(56) References Cited

U.S. PATENT DOCUMENTS

| | | | |
|---|---|---|---|
| 4,761,685 A * | 8/1988 | Asaida et al. ................. | 348/188 |
| 4,972,494 A | 11/1990 | White et al. | |
| 5,140,418 A | 8/1992 | Rivamonte | |
| 5,535,127 A | 7/1996 | Uno et al. | |
| 5,737,438 A | 4/1998 | Zlotinik et al. | |
| 5,760,829 A | 6/1998 | Sussmeier | |
| 5,768,446 A | 6/1998 | Reasoner et al. | |
| 5,770,864 A | 6/1998 | Dlugos | |
| 5,820,547 A * | 10/1998 | Strobl et al. .................. | 600/127 |
| 6,009,189 A | 12/1999 | Schaack | |
| 6,064,629 A | 5/2000 | Stringer et al. | |
| 6,064,759 A | 5/2000 | Buckley et al. | |
| 6,278,460 B1 | 8/2001 | Myers et al. | |
| 8,424,735 | 7/2002 | Daniel Freifeld | |
| 6,501,554 B1 | 12/2002 | Hackney et al. | |
| 6,606,395 B1 | 8/2003 | Rasmussen et al. | |
| 6,845,914 B2 | 1/2005 | Bian et al. | |
| 6,851,610 B2 | 2/2005 | Knowles et al. | |
| 6,980,690 B1 | 12/2005 | Taylor et al. | |
| 6,988,660 B2 | 1/2006 | Tsikos et al. | |
| 6,992,696 B1 | 1/2006 | Albertelli | |
| 7,118,042 B2 | 10/2006 | Moore et al. | |

(Continued)

FOREIGN PATENT DOCUMENTS

WO WO 03/102501 A1 12/2003

OTHER PUBLICATIONS

U.S. Appl. No. 11/732,541, filed Apr. 4, 2007, Dwinell et al.

(Continued)

*Primary Examiner* — James Hannett
(74) *Attorney, Agent, or Firm* — Iandiorio Teska & Coleman, LLP

(57) ABSTRACT

A system for the automated analysis of image quality obtained by a camera in a camera tunnel system includes a test pattern on an item for placement in the camera tunnel system and an imaging subsystem configured to capture an image of the item using the camera tunnel system, wherein the image includes an image of the test pattern. The system further includes an image analysis tool configured to automatically identify and analyze the image of the test pattern for generating one or more image quality metrics.

43 Claims, 29 Drawing Sheets

U.S. PATENT DOCUMENTS

| | | | |
|---|---|---|---|
| 7,142,726 B2 | 11/2006 | Ziegler et al. | |
| 7,233,682 B2 | 6/2007 | Levine | |
| 7,277,187 B2 | 10/2007 | Smith et al. | |
| 2002/0114508 A1 | 8/2002 | Love | |
| 2002/0118874 A1 | 8/2002 | Chung et al. | |
| 2002/0163573 A1 | 11/2002 | Bieman et al. | |
| 2003/0144800 A1 | 7/2003 | Davis et al. | |
| 2004/0175052 A1* | 9/2004 | Bian et al. | 382/254 |
| 2005/0259847 A1 | 11/2005 | Genc et al. | |
| 2007/0002143 A1* | 1/2007 | Elberbaum | 348/188 |
| 2007/0181685 A1 | 8/2007 | Zhu et al. | |
| 2007/0237356 A1 | 10/2007 | Dwinell et al. | |
| 2008/0156882 A1* | 7/2008 | Tsikos et al. | 235/462.43 |

OTHER PUBLICATIONS

William K. Pratt, "*A Conceptual Bug Marching Algorithm*", "Digital Image Processing", Second Edition, Sun Microsystems, Inc. Mountain View, California 1991, Chapter 18, pp. 623-625 (5 pages total).

Quddus, A; and Fahmy, M. M., "Fast Wavelet-Based Corner Detection Technique" Electronic Letters vol. 35, Issue No. 4, Feb. 1999, pp. 287-288.

\* cited by examiner

BINARY IMAGE
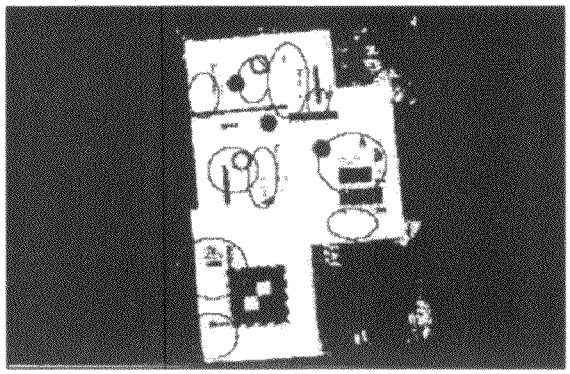
FIG. 8A
○
EROSION SHRINKS OBJECTS
EROSION
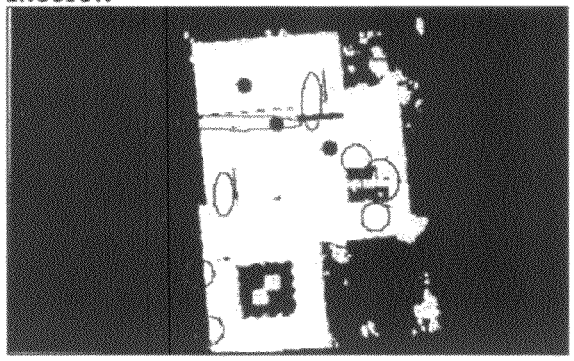
FIG. 8B
DELETE BLACK NOISE
DELETE 1 PIXEL BLACK NOISE
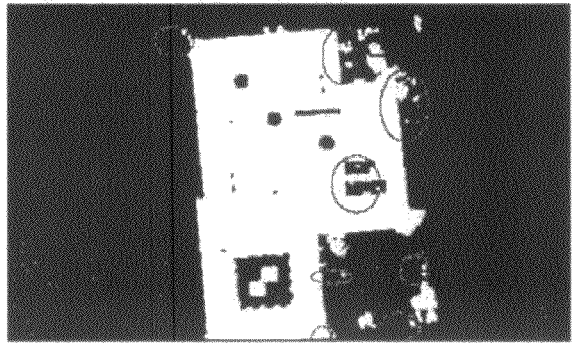
FIG. 8C
DILATION GROWS OBJECTS
DILATION
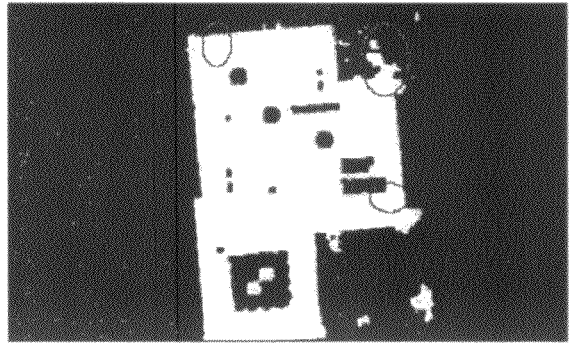
FIG. 8D
DELETE WHITE NOISE

IMAGE QUALITY ANALYSIS WITH TEST PATTERN

RELATED APPLICATIONS

This application claims the benefit of and priority to U.S. Provisional Patent Application Ser. No. 60/794,007 filed Apr. 21, 2006, which is incorporated herein by reference.

FIELD OF THE INVENTION

This subject invention relates to image quality analysis, and in one example, automated analysis of image quality utilizing a test pattern for use in a camera tunnel system.

BACKGROUND OF THE INVENTION

Multiple camera tunnel systems can offer very high read rates when they are properly configured and maintained. In order to ensure that such camera tunnel systems are properly functioning, the performance of the camera in such systems needs be measured and compared to some standard. Currently such camera quality measurements are conducted by human operators and as such they are very dependent on variance from one operator to the next. The measurement metrics for the performance quality of the camera in such tunnel systems tends to include a very large operator influence. Such an operator-based influence adversely impacts the consistency of the measurement of such metrics over time and across various systems.

High speed camera tunnel systems can offer advances in barcode reading performance. Such systems can offer the use of package images for advanced features not possible with current laser-based scanning systems. However, in order to harness the full potential of high speed camera tunnel systems their image acquisition capabilities need to be well-maintained.

Current methods of evaluating a camera tunnel setup involve manually analyzing saved images that include a test pattern. For example, current image analysis software programs (e.g., Photo Shop) can be used to inspect various features of the test pattern image. This inspection requires a skilled operator and does not ensure consistency, especially across various systems, because in each case the particular operator follows a series of steps or prompts, each of which is subjective and subject to variations among different operators and systems. The values determined from this series of manual, subjective operations thus typically will vary among systems and their operators. The subjective nature of using the operator to evaluate an image fails to meet the need for a consistent, repeatable and verifiable evaluation of the system. Additionally, even if an entire cadre of skilled and consistent operators were available, the need for a skilled operator limits the value of such an operator-based system.

Consequently, current manual image analysis techniques do not offer a consistent, repeatable, objective and verifiable measure of the camera system's performance. The large scale deployment and broad acceptance of such systems require an image analysis solution that does not requires manual operation by specially trained technicians.

There is therefore a need for a system and a method to measure the quality of the performance of a camera system that does not suffer from the above-mentioned shortcomings.

SUMMARY OF THE INVENTION

It is therefore an object of this invention to provide a system for and a method of image quality analysis which is more consistent.

It is a further object of this invention to provide such a system and method which is less subjective.

It is a further object of this invention to provide such a system and method which does not require a highly skilled operator.

The subject invention results from the realization that more consistent, less subjective image quality analysis for use by operators having varying skills can be achieved by automating the image quality analysis, such that an operator need not perform a series of subjective steps including choices and/or data inputs in order for desired values reflecting image quality to be determined.

The present invention provides an automated method and system for analysis of image quality, such as for an image obtained by a camera in a camera tunnel system. The invention includes providing a test pattern for application to a package for placement in the camera tunnel system, capturing an image of the package using the camera tunnel system, wherein the image includes an image of the test pattern, and identifying the image of the test pattern. In various embodiments, the present invention also includes analyzing the image of the test pattern, in one example for generating one or more image quality metrics, and/or comparing the one or more metrics with a threshold value to form a comparison, and/or determining the performance of the camera in the camera tunnel system using the comparison. In another embodiment, the present invention automatically adjusts the image quality, including settings of the camera, so as to bring the camera's performance to within a desired range which may be defined by a threshold value, thus improving the overall performance of a camera tunnel system.

The subject invention, however, in other embodiments, need not achieve all these objectives and the claims hereof should not be limited to structures or methods capable of achieving these objectives.

This invention features a system for the automated analysis of image quality obtained by at least one camera in a camera tunnel system including a test pattern on an item for placement in the camera tunnel system, an imaging subsystem configured to capture an image of the item using the camera tunnel system, wherein the image includes an image of the test pattern. The system further includes an image analysis tool configured to automatically identify the image of the test pattern, and automatically analyze the image of the test pattern for generating one or more image quality metrics. The item may be a package or a parcel which may be shipped. Typically, the one or more image quality metrics may be selected from the group consisting of illumination, contrast, noise, resolution, focus and combinations thereof. The image analysis tool may be further configured to generate a printable version of the test pattern. In one example, the test pattern may have an overall shape having a non-circular-shaped perimeter, and the test pattern may be comprised of a central contrast area having adjacently disposed dark and light areas defining a central location where the dark and light areas meet. The central contrast area may be surrounded by one or more focus test areas, the focus test areas having a barcode-like pattern, and the barcode-like pattern may include bar codes arranged in a gradually varying resolution. The focus test areas may include a barcode-like pattern surrounding the perimeter of the central contrast area such that each focus test area's bar codes are substantially perpendicular to its adjacent focus test area's bar codes, and/or the focus test areas may have a first side and a second side where the first side is adjacent to the central contrast area, and the second side is adjacent to a machine-readable scale. In one configuration, the machine readable scale comprises alternately arranged dark and light portions. In one embodiment, the image analysis tool may be further configured to compare the one or more metrics with a predetermined threshold value for the one or more metrics to form a comparison. In another variation, the image analysis tool may be further configured to automatically adjust an image quality setting of the at least one camera to bring the camera's performance to within a desired range. The system may further include a decoder subsystem configured to read a symbol and the item may include a symbol. In one example, the decoder subsystem is configured to generate a signal and the image analysis tool is configured to be responsive to the signal and to save the image of the test pattern in memory. The image analysis tool may be further configured to commence identifying and analyzing the saved image of the test pattern. The system may also include a report generation subsystem for writing the one or more metrics to a file.

This invention further features a system for the automated analysis of image quality obtained by at least one camera in a camera tunnel system, including a test pattern on an item for placement in the camera tunnel system, and an imaging subsystem configured to capture an image of the item using the camera tunnel system, wherein the image includes an image of the test pattern. The system also includes an image analysis tool configured to identify the image of the test pattern, analyze the image of the test pattern for generating one or more image quality metrics, and automatically adjust an image quality setting of the at least one camera.

This invention also features a system for the automated analysis of image quality obtained by at least one camera in a camera tunnel system including a test pattern and a symbol, each on an item for placement in the camera tunnel system, and an imaging subsystem configured to capture an image of the item using the camera tunnel system, wherein the image includes an image of the test pattern. The system also includes a decoder subsystem configured to read the symbol and generate a signal, and an image analysis tool configured to respond to the signal and save the image of the test pattern, identify the image of the test pattern, and analyze the image of the test pattern for generating one or more image quality metrics.

This invention also features a method for the automated analysis of image quality obtained by at least one camera in a camera tunnel system including a test pattern on an item for placement in the camera tunnel system, capturing an imaging of the item using the camera tunnel system, wherein the image includes an image of the test pattern, identifying the image of the test pattern automatically, and automatically analyzing the image of the test pattern for generating one or more image quality metrics. The test item is typically a parcel or package which may be shipped. In one example, the one or more image quality metrics are selected from the group consisting of illumination, contrast, noise, resolution, focus and combinations thereof. The method may further include generating a printable version of the test pattern. In one variation, the test pattern may have an overall shape having a non-circular-shaped perimeter, and a central contrast area having adjacently disposed dark and light areas defining a central location where the dark and light areas meet.

The central contrast area may be surrounded by one or more focus test areas, the focus test areas having a barcode-like pattern, and the barcode-like pattern may comprise bar codes arranged in a gradually varying resolution. The focus test areas may have a barcode-like pattern surround the perimeter of the central contrast area such that each focus test area's bar codes are substantially perpendicular to its adjacent focus test area's bar codes, and the focus test areas may typically have a first side and a second side where the first side is adjacent to the central contrast area, the second side adjacent to a machine-readable scale. The machine readable scale typically includes alternately arranged dark and light portions.

In one embodiment, the method further includes comparing the one or more metrics with a predetermined threshold value for the one or more metrics, and in one variation automatically adjusting an image quality setting of the at least one camera to bring the camera's performance to within a desired range. The item may include a symbol thereon and the method may further include reading the symbol on the item. The method may further include saving the image of the test pattern in memory, and identifying and analyzing the saved image of the test pattern. The method may further include generating a report of the one or more metrics to a file.

This invention also features a method for the automated analysis of image quality obtained by at least one camera in a camera tunnel system including a test pattern on an item for placement in the camera tunnel system, capturing an image of the item using the camera tunnel system, wherein the image includes an image of the test pattern, identifying the image of the test pattern, analyzing the image of the test pattern for generating one or more image quality metrics, and automatically adjusting an image quality setting of the at least one camera.

This invention further features a method for the automated analysis of image quality obtained by at least one camera in a camera tunnel system including a test pattern and a symbol on an item for placement in the camera tunnel system, capturing an image of the item using the camera tunnel system, wherein the image includes an image of the test pattern, reading the symbol and generating a signal, saving the image of the test pattern in response to the signal, identifying the image of the test pattern, and analyzing the image of the test pattern for generating one or more image quality metrics.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 8A-F are schematic depictions of intermediate images of a binary image as it is processed in accordance with one aspect of the present invention;

DETAILED DESCRIPTION OF THE INVENTION

Figure 1A:
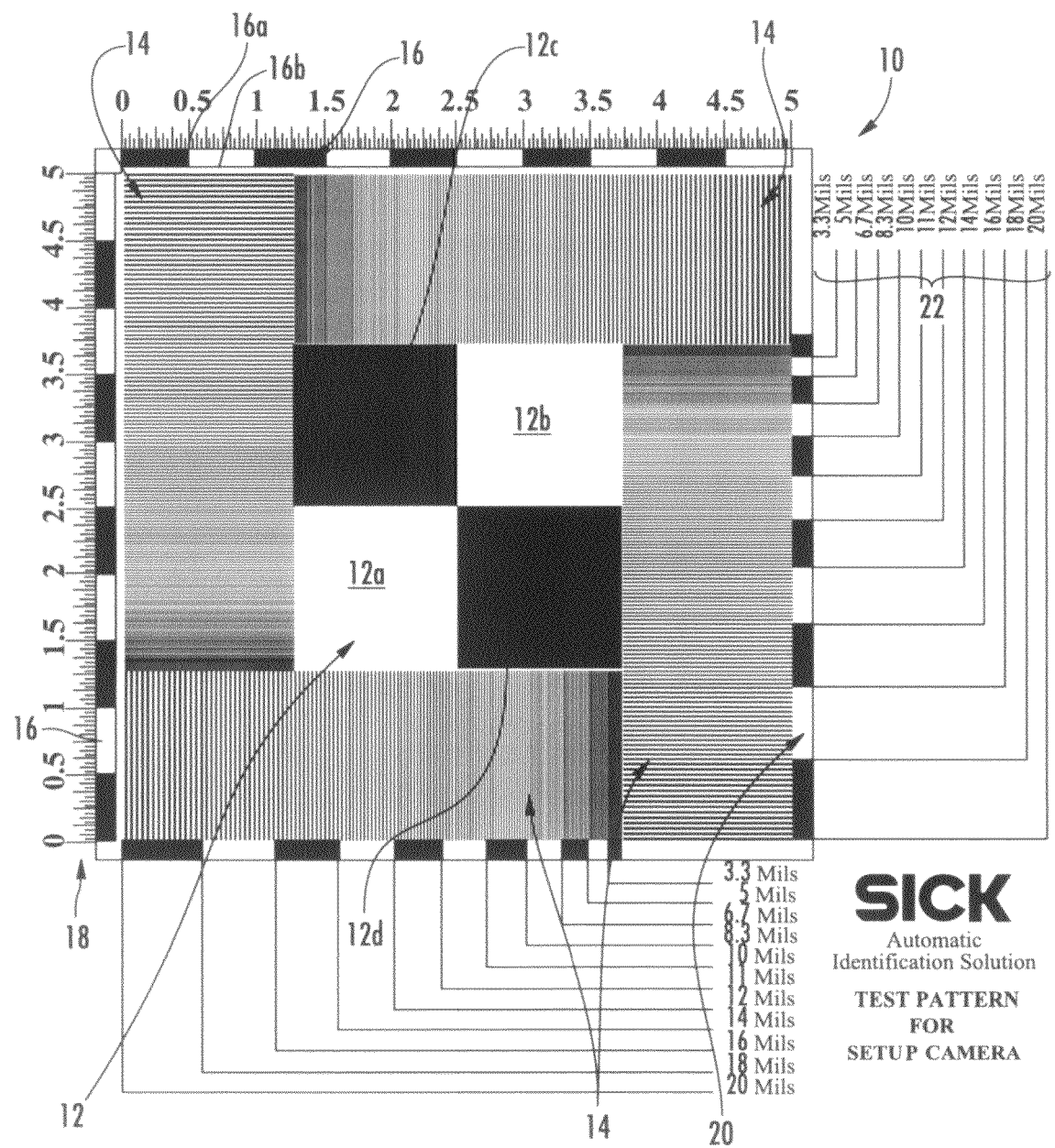
FIG. 1A is a schematic depiction of one exemplary test pattern in accordance with the present invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1A shows one example test pattern in accordance with the present invention. As is shown in FIG. 1A, test pattern 10 has various unique and novel features that enable its identification and capture by a high speed camera. Moreover, unique features of test pattern 10 enable the image analysis tool of the present invention to analyze an identified test pattern image and generate various image quality metrics. For example, as is shown in FIG. 1A, the test pattern includes a centrally located contrast test area 12 that is surrounded by focus test areas 14. Focus test areas 14 include bar code-like patterns, which typically surround the perimeter of central contact area 12, and at least two of focus areas 14 are bordered by machine readable ruler scale 16, and then ruler scale 18 is adjacent to machine-readable ruler scale 16. Two focus test areas 14 are adjacent to machine readable testing focus scale 20, which are in turn adjacent to focus scales 22. As can be seen in FIG. 1A, unlike many other machine-readable test patterns, the test pattern is non-circular. The contrast area, focus area and focus scales of test pattern 10, as well as its other attributes, enable its consistent capture and analysis by the camera system. The test pattern is typically provided to a user or operator of a camera tunnel system, for example, for easy affixation to an item such as a parcel or box, and/or a test pattern image may be provided on a computer readable media along with the image analysis tool for execution by a host computer for use by the operator. As used herein, a variety of computer-readable media may be used for the recording media that stores the image analysis tool and other aspects of the system and method of the present invention, most of which are preferably implemented in software, including but not limited to: CD-ROM, flexible disks, magneto-optic discs, IC cards, ROM cartridges, punched cards, and internal storage devices (memories, such as RAM and ROM) and external storage devices.

In one example, a host computer is used to load and print the test pattern image. The test pattern is then typically applied to an item or package although the item itself may include the test pattern, and the item or package is fed through a camera tunnel system. Alternatively one or more test patterns are on or printed and placed on different or the same sides of the package and the package is fed through a camera tunnel system. The test pattern's unique geometrical properties and the image analysis system and method of the subject invention are enabled to effectively use the test pattern regardless of the actual printed size of the test pattern.

Figure 1B:
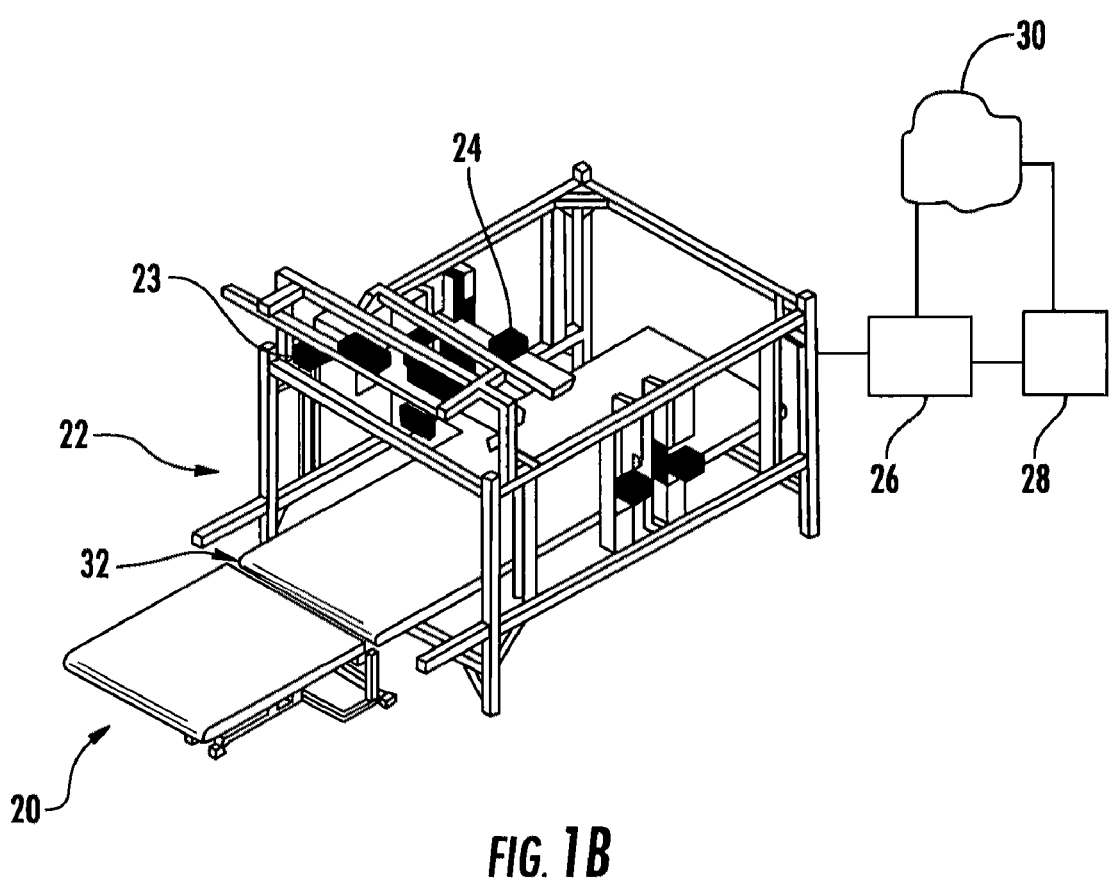
FIG. 1B is a schematic three-dimensional perspective view showing a typical parcel sorting and shipping installation or camera tunnel system.

As used herein, a camera tunnel system refers to a system such as the one shown in schematic form in FIG. 1B, typically conveyor-belt system 20 that passes through a passageway or a tunnel 22 surrounded by several cameras 24, and parcels and packages pass through tunnel 22. Such a camera tunnel system can determine the dimensions of the packages that pass through it using information received from units 23 for example. The cameras 24 can use the dimensioning data to adjust their focus and take an image of each applicable box side, whereby the camera tunnel system can direct each camera to dynamically adjust its focus by providing the dimension, orientation and location information for each package (e.g., length, width, height, angle, center of gravity). The camera images are transmitted to one or more local computers 26, where the images are processed and data interpreted. The system can transmit the package dimensions and data to host systems 28, for example, via a material handling interface. The one or more host computers can also provide operational and statistical data to the camera tunnel system's monitoring computer. Such camera tunnel systems typically include several cameras 24 that are all operationally interconnected with the one or more local computers 26. Local computer(s) 26 or host system(s) 28 may be part of a network 30 such that numerous sorting systems can be linked together.

A camera tunnel system as referred to herein may include one or more digital line scan cameras having either a CCD or a CMOS sensor array, one or more auto-focus line scan cameras, and one or more fixed focus cameras. As used herein, the auto-focus line scan cameras can dynamically move the sensor arrays in order to focus the image as the package moves through the cameras' scan zone. Furthermore, as referred to herein, the fixed focus camera can be a camera that images the bottom of the package, or the camera that is under the conveyor belt. Such a fixed focus camera looks up through a break in the belt 32 and scans the package as it passes from one belt section to the next. The multiple auto-focus cameras can be arranged to be able to image up to six (6) sides of a package. Typically the cameras are configured to function independently of skew. In other words, the cameras are often arranged in such a way as to be able to image all sides of the package independent of package skew (e.g., left/front, right/back, right/front, right/back, top, bottom). This is sometimes referred to as a quadrant configuration. With a package oriented at 0 degree angle (or 90°, 180°, 270°, 360°) to the direction of conveyor flow, the various side cameras each can image two faces of the package (such as left and front). The side images in this case can also be redundant between two cameras for each side face. As the package skew approaches a 45 degree angle, each side face is then only imaged by one camera. With the cameras configured to be independent of skew, there is no package orientation that could result in an image that could not be properly acquired by at least one camera for all package faces.

Figure 1C:
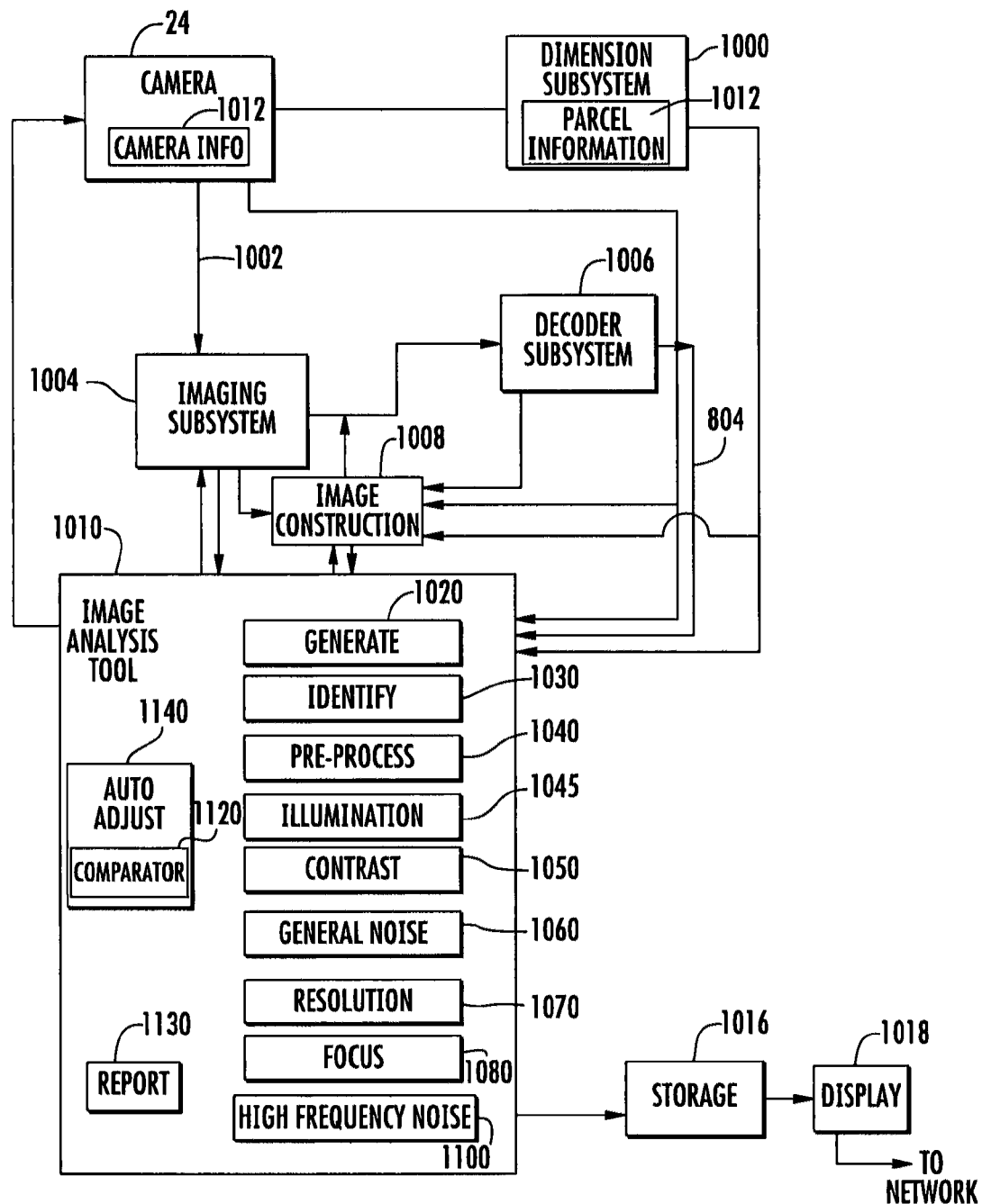
FIG. 1C is a schematic block diagram showing the primary components associated with one example of an image analysis system and method in accordance with the present invention.

One exemplary image analysis system for determination of and/or measurement of image quality in accordance with the present invention is shown in FIG. 1C. Typically, the output from a typical dimension subsystem or module 1000 associated with the camera tunnel system (including unit 23 and the like, FIG. 1B) provides position and/or dimension data to image sensors 24 such as line scan cameras which then controls their focusing on the various parcels. Dimension subsystem 1000 may be a general dimensioning subsystem, or it may include a fine dimensioning subsystem or module such as the one described in the co-pending U.S. patent application filed Apr. 4, 2007 entitled Parcel Dimensioning Measurement System and Method, by common inventors as those hereof and the same assignee, which is incorporated herein by reference.

An analog-to-digital converter measures the charge on each pixel of the line scan cameras and converts the charge information to a digital output provided on fiber optic cable 1002 as an input to imaging subsystem or module 1004, which then can store the image or images—which are typically two-dimensional images—in a memory. A CMOS sensor could also be used. As noted above, there may be one or more image sensors or cameras and associated optical elements provided and oriented to image all three dimensions of a parcel or multiple image sensors oriented to view different parcel dimensions, e.g., the top, the bottom, and one or more sides. In one variation there are at least two line scan cameras oriented to image the parcels.

Using the image or images in memory, decoder subsystem 1006 decodes any barcodes present on the parcel. In one example, barcode decoders such as those described in U.S. Pat. No. 6,845,914 and co-pending application Ser. No. 10/382,405 (U.S. Pat. App. Publ. No. 2004/0175052), both incorporated herein by this reference, may be utilized.

The output of imaging subsystem 1004 may be provided to an image construction subsystem 1008 which may be configured to produce viewable three-dimensional images of each parcel passing through the tunnel of a shipping/sorting installation. Alternatively, image construction subsystem 1008 may be part of imaging subsystem 1004. The outputs of imaging subsystem or module 1004, dimension subsystem 1000, and decoder system 1006 can also be routed to image analysis tool 1010 for image analysis in accordance with the present invention as described more fully below. While decoder subsystem 1006 preferably is configured to decode barcodes, decoder subsystem may also be configured to read character verification symbols and/or radio frequency identification (RFID) tags. Dimension subsystem 1000 typically includes parcel information 1012 for locating the general area of the parcel in an image, such as general information regarding parcel length, width and height, as well as its angle on the transport conveyor, its center of gravity, and its four corner coordinates, although dimension subsystem 1000 may include more or less types of information for a particular application.

Image sensors or line scan cameras 24, such as auto focus line scan CCD cameras, provide camera information 1012 to imaging subsystem 1004 and/or image analysis tool 1010. Camera information 1012 includes information concerning the actual physical layout of the camera tunnel through which the parcel passes, and typically includes information such as the number of cameras, which camera is providing the information and from what angle (i.e. top camera at 15°, side camera at 45°) as well as information regarding DPI (dots per inch) and LPI (lines per inch).

In accordance with one embodiment of the present invention, image analysis tool 1010 determines numerous values and metrics and other information for use by an operator and/or stores such information as shown at 1016 and/or displays it as shown at 1018. Storage 1016, including files containing information and images, can be accessed via a network as shown and as discussed above with reference to FIG. 1B.

In one configuration, image analysis tool 1010 includes software or makes use of various technology to, for example, to generate, load, display and/or print the test pattern. Thus, generate test pattern subsystem or module 1020 may be one component of image analysis tool 1010, configured to generate, load, display and/or print out the test pattern for application to a parcel or package.

Identification subsystem or module 1030 identifies the test pattern in a two dimensional image produced by imaging system 1004 and/or image construction subsystem 1008. Preprocessing subsystem or module 1040 prepares the image for subsequent computation of particular desired performance metrics. Illumination subsystem or module 1045 analyzes how well lit the object, e.g. the test pattern, is. Contrast module or subsystem 1050 determines and provides image contrast information. General noise subsystem or module 1060 determines the noise level in an image. Resolution subsystem or module 1070 determines image resolution in pixels/inch. Focus subsystem or module 1080 determines the sharpness of an image, and high frequency noise subsystem or module 1100 may provide further information concerning noise in an image. All modules typically also provide and display such information to a system operator.

In one variation, comparator subsystem or module 1120 compares the results of any test for any metric with a historical or predetermined value or threshold, and adjustment subsystem or module 1140 automatically adjusts cameras and/or images for improved overall image quality. As shown, comparator module 1120 is part of adjustment module 1140, but this is not a necessary limitation. Report generation subsystem or module 1130 may also be included if desired, to generate reports based on the image quality analysis. Preferably, the subsystems or modules described herein are software modules configured or programmed to perform their various functions. In FIG. 1C, components 24 and 1000-1140 are shown as separate components. This is not a necessary limitation, however, and all of the components may be part of a single device, or such components may be grouped together in various ways in various devices as desired for a particular application.

Figure 2:
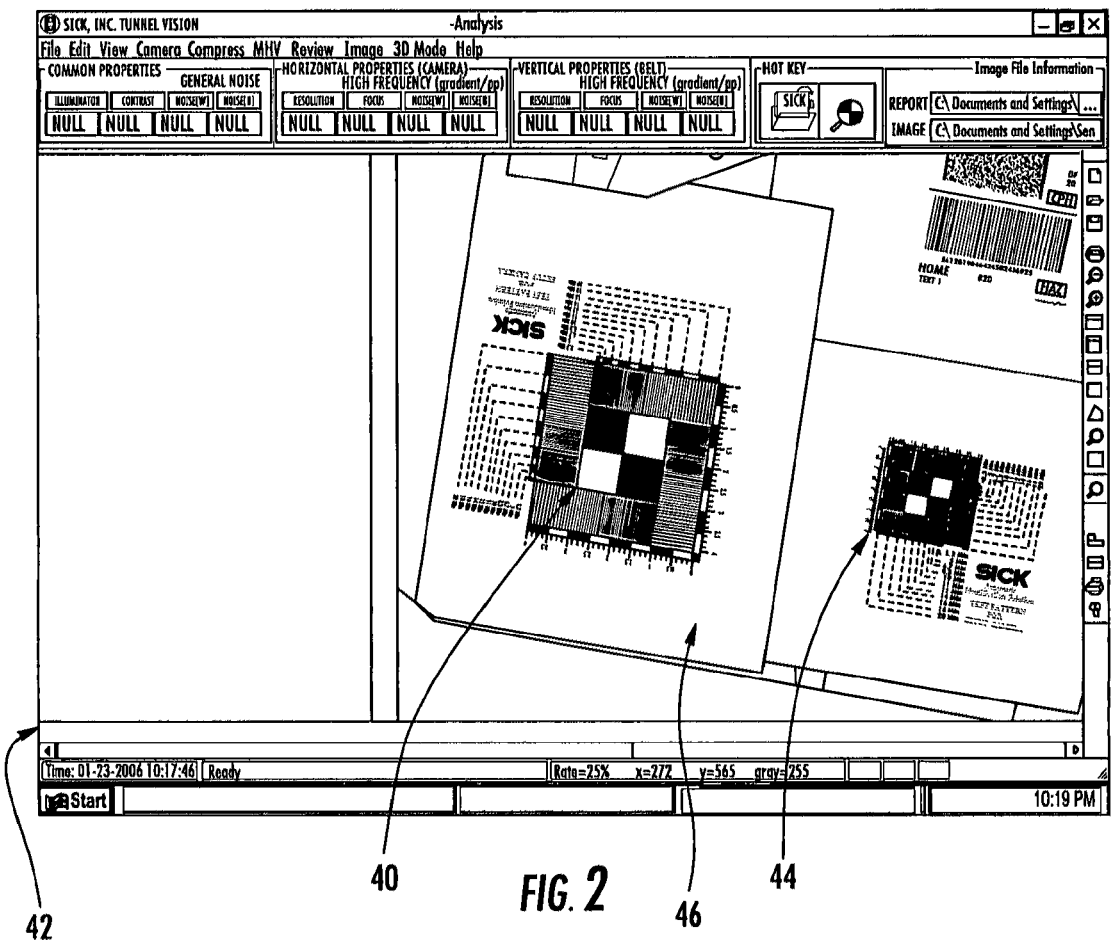
FIG. 2 is a schematic depiction of one example of an image of the test pattern of FIG. 1 in a computer viewing window for display to a system operator in accordance with the present invention.
Figure 3:
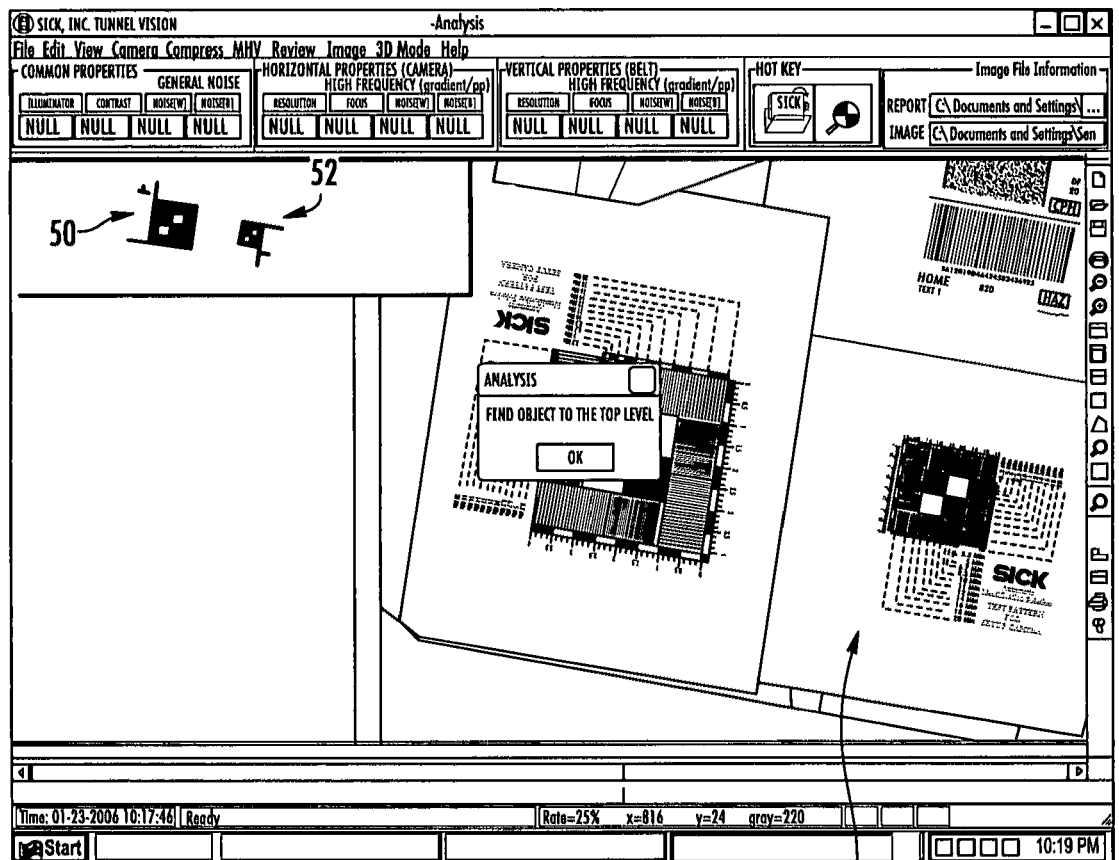
FIG. 3 is a schematic depiction of one example of test patterns located in the image of FIG. 2.
Figure 4:
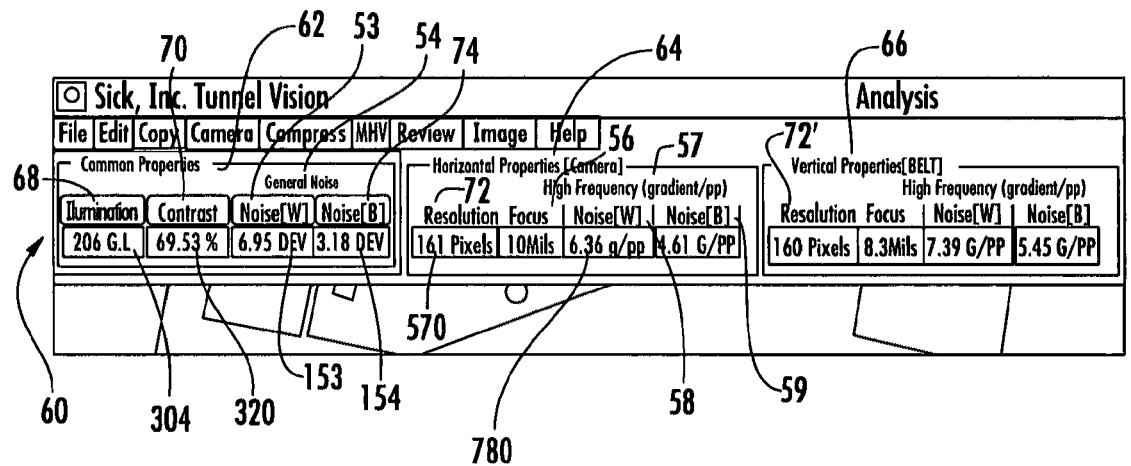
FIG. 4 is a schematic depiction of examples of types of information or metrics computed and displayed for a test pattern in accordance with the present invention.

FIG. 2 shows test pattern image 40 of FIG. 1A in accordance with one embodiment of the present invention. In one configuration, image analysis tool 1010, FIG. 1C is configured to generate and/or load the captured image 42, including test pattern image 40, and display it, for example, on a display terminal of a host computer to a user. As can be seen in FIG. 2 two test patterns 40, 44 were generated or provided and placed on package 46 and therefore two test patterns 40, 44 are displayed in displayed or loaded captured image 42. Although the test pattern image in accordance with the present invention has various unique and novel features that enable its identification and capture by the high speed camera, it may be printed out and manually attached to a parcel, for example, as desired for a particular application and in ways known in the art. Next, image analysis tool 1010 is configured to identify or find test pattern image 40 in the captured and loaded image 42, as more fully described below. Once test image 40 (and/or 44) has been identified, icons can be displayed to the user that represent the identified test pattern image. For example, as shown in FIG. 3, the two smaller images 50, 52 represent the two identified test patterns 40, 44 that are on box 46 as shown in FIG. 2. At this stage two test patterns have been identified, and the user is enabled to select one test image for automated analysis. Once the analysis of one test image e.g., test pattern image 40, has been completed, the user has the option of finding additional patterns, e.g. test pattern 44. Once image analysis tool 1010 identifies a test pattern, it automatically analyzes the identified pattern and computes an array of information as described more fully below. This information represents the performance of the camera on that test pattern, and is displayed to the user such that adjustments to the camera tunnel system, for example, can be made as necessary, and in one embodiment automatically. As shown in FIG. 4, for example, displayed tool bar 60 shows an array of performance metrics. The displayed toolbar shown in FIG. 4, as well as the tool bars, buttons and manner of display of items as described herein are not limiting, however, and such displays may be arranged as desired for a particular application.

Also as shown in FIG. 4, in various configurations the camera performance metrics can include common properties 62, horizontal properties (e.g., camera properties) 64 and vertical properties (e.g., belt properties) 66. When a user selects a button above each information box, such as illumination (in common properties) 68, contrast (in common properties) 70, resolution (in horizontal or vertical properties) 72, 72', general noise 54 and noise (in horizontal or vertical properties) and the like, a sub-window can appear to provide more detailed information related to that particular information item.

Figure 5:
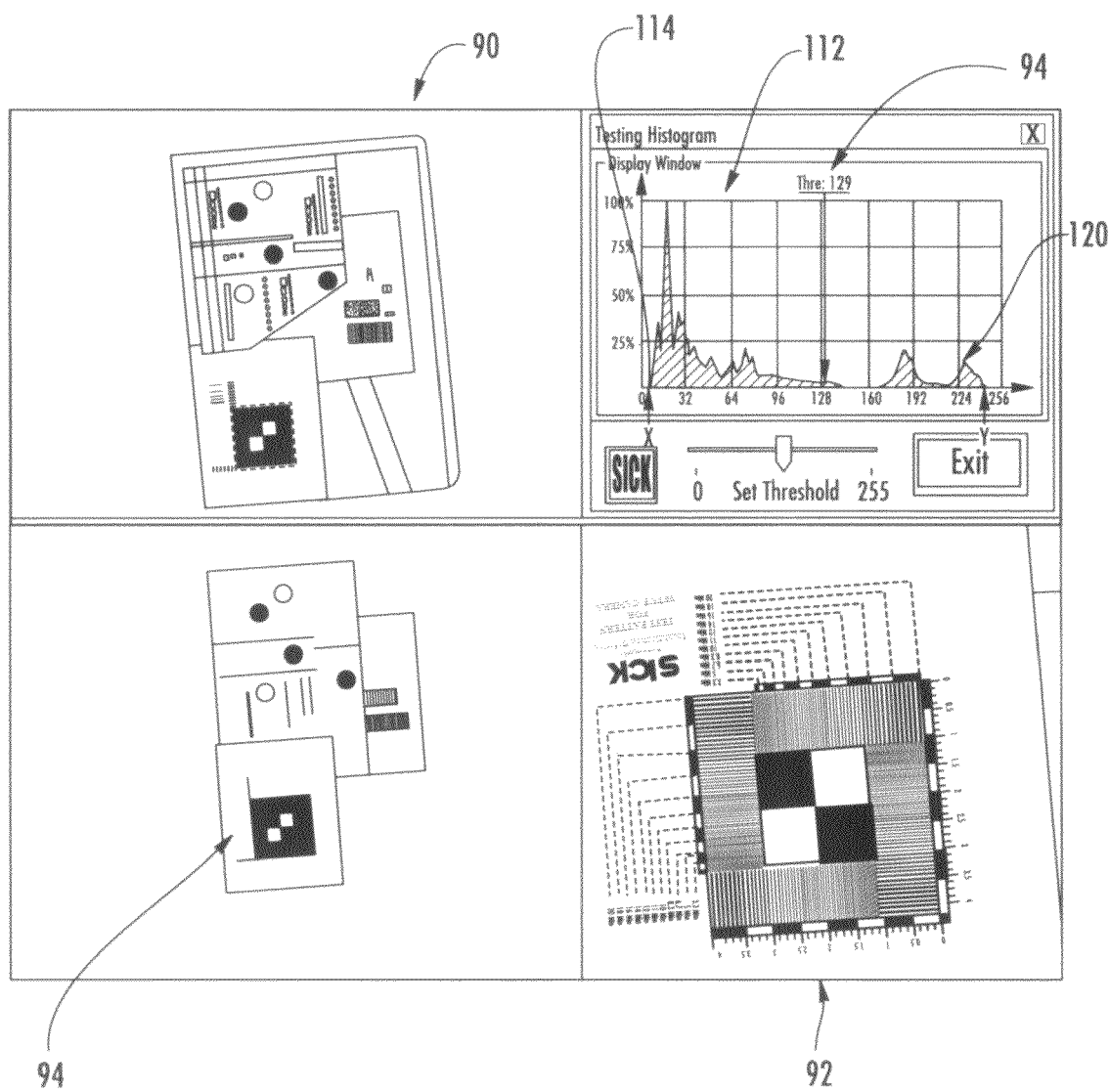
FIG. 5 is a schematic depiction of one example of a composite image showing a top level image, a bottom level image, a binary image and a displayed histogram relating to a binary threshold value in accordance with the present invention.
Figure 6:
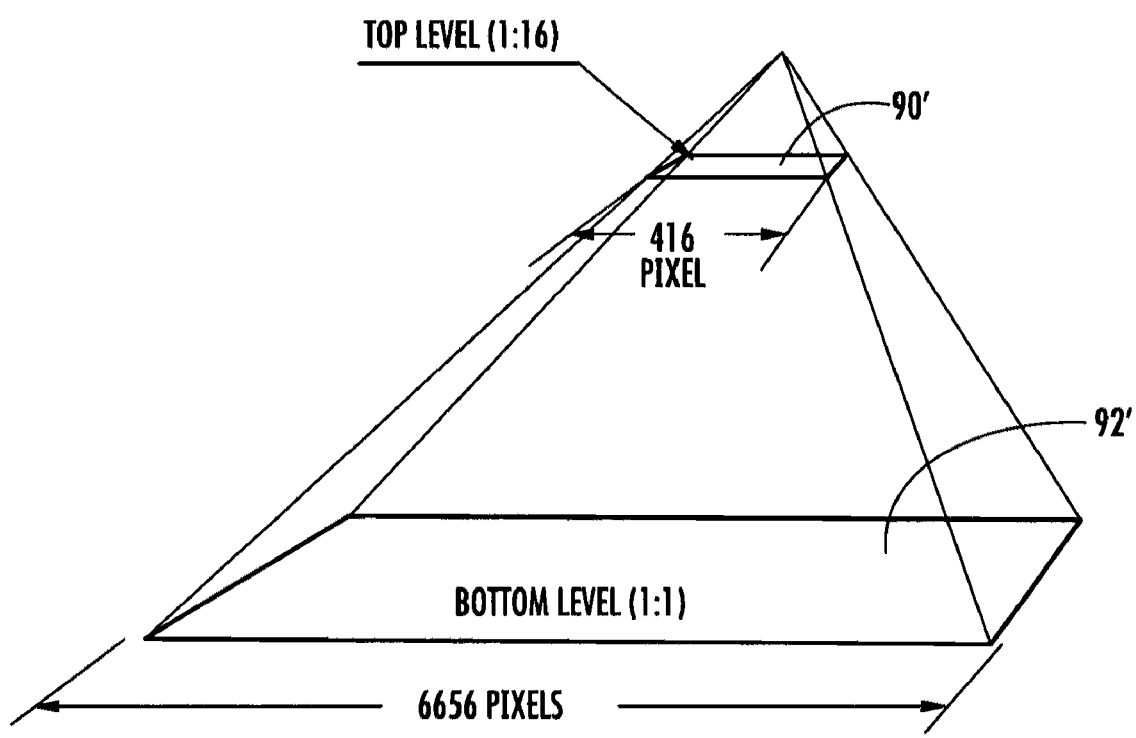
FIG. 6 is a schematic depiction of one example of an image showing a two-level data structure (e.g. a top level image and a bottom level image) in accordance with the present invention.

Further details of the identification of a test image and its processing are described below. FIG. 5 shows a composite image showing top level image 90, bottom level image 92, and binary image 94 as the terms are used herein. Top level image 90 includes a sub-sampled image (e.g. every $16^{th}$ pixel is sampled) of the box or parcel, the test pattern and any background imagery. FIG. 5 also shows a displayed histogram 112 including dynamic change threshold value 94, which serves as the mid-point or threshold point for white and black areas in the binary image as explained further below. FIG. 6 shows an exemplary image of the two-level data structure (i.e., top level image 90', and the bottom level image 92') in accordance with the embodiments of the present invention. The terminology may be better understood by reference to FIG. 6. Using the two-level structure, in one embodiment of the system and method of the subject invention, identification module 1030, FIG. 1C of image analysis tool 1010 compresses or sub-samples the bottom level image and maps it to the top level image. The top level image is binarized to create a top level binary image. Then a first-level or an approximate or rough level search of the test pattern is conducted, and based on this first-level search the test pattern is located and found, and then it is mapped the bottom level. As shown in FIG. 6, the top level image is a lower resolution image and the bottom level image is a higher resolution one. The displayed histogram including the binary threshold value shows a measure of the accuracy of the mapping and compression between the top and bottom level images and the quality of the binary image rendering of the top level image.

As a preliminary step in the search for the object (i.e. a test pattern candidate in the image) on the top level, the top level image is "binarized" to create a binary image. All pixels in the two-dimensional top level image above a certain pixel value (with 0=black and 255=brightest white) are assigned a binary value of 1 (white), and all pixels below that certain value, are assigned a binary value of 0. As used herein, that certain pixel value delineating assignment of a binary value is referred to as the threshold value, as shown at 94, FIG. 5 for example. The threshold value may be assigned arbitrarily, e.g. at 128, the midway point between darkest and brightest areas.

Figure 7:
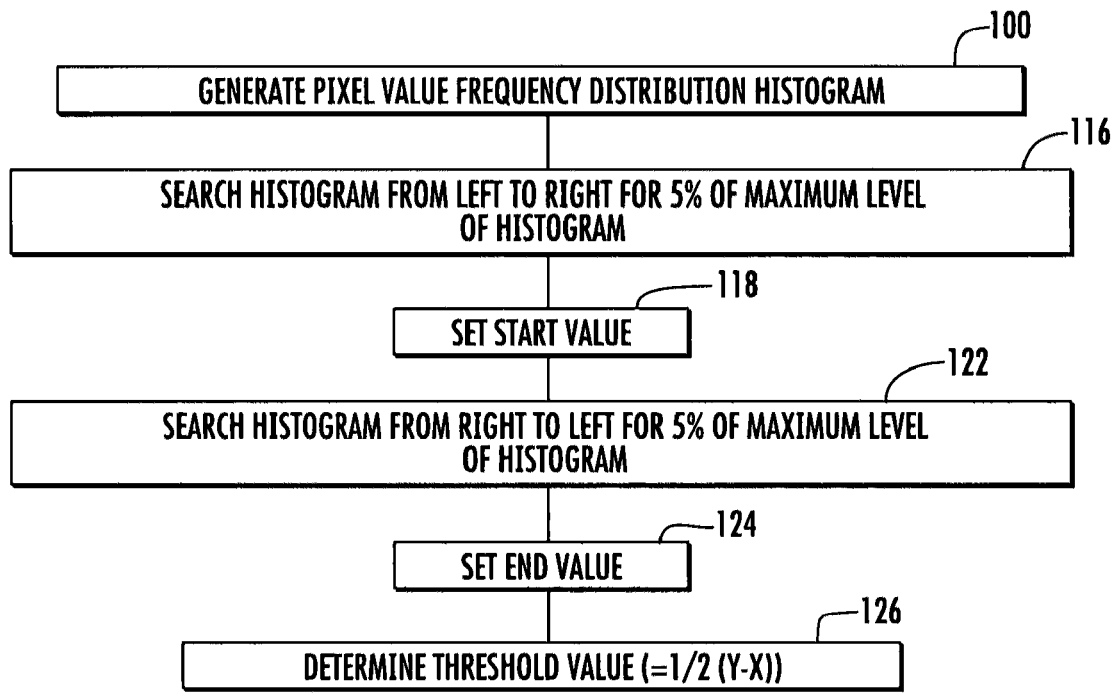
FIG. 7 is a flow chart depicting one example of the primary processing steps for finding a threshold value for a binary image in accordance with the present invention.

In one variation of the subject invention, however, the threshold value can be more accurately determined by generating a histogram plotting the distribution of pixel values for all pixels in the two-dimensional image (from 0 through 255), step 100, FIG. 7. One example of such a pixel value frequency distribution histogram is shown at 112, FIG. 5. Next, a search from the left side of the histogram to the right side is conducted for 5% of the maximum level 114 of the histogram to find the pixel value start value (value X for example), step 116, FIG. 7 and the start value is set at that point, step 118. Next, a search from right to left is conducted for 5% of the maximum level 120 of the histogram, FIG. 5 to find the pixel value end value (value Y for example), step 122, FIG. 7 and the end value is set to that point, step 124. The middle position or threshold value 94, FIG. 5 (the value above which pixels in the binary image will have a value of 1, and below which pixels in the binary image will have a value of 0) is determined by finding one-half of the difference between the start and end values, step 126, FIG. 7. In the foregoing example, the threshold value would be ½(Y−X), where if X=8 and Y=228, the threshold value or cutoff point for generating white and black areas of the binary image would be 110.

In one embodiment, binarization, or creation of the binary (top level) image, also includes a morphology process and a flooding process. The morphology process's function is to remove, delete or minimize noise in the binary image. The flooding process helps to identify and locate the test pattern. In a sense the background portions of the binary image are flooded so that remaining features that do not get flooded are left for the identification of their location. The morphology process includes erosion, deletion of black noise, dilation, and the deletion of white noise.

FIGS. 8A-F show intermediate images of a binary image as it is processed. Binary image 130 is first subjected to an erosion process, step 132. One example of binary image 130 is shown before erosion in FIG. 8A, and after erosion in FIG. 8B. Erosion tends to shrink objects. In broad conceptual terms, if for example lone black pixels (binary value of 0) are surrounded by white pixels (binary value of 1), erosion will change the value of such "black" pixels to 1. Binary image 130 is also subjected to a dilation process, step 134, FIG. 9, as shown in one example in FIG. 8D. Dilation tends to grow objects, and in broad conceptual terms, if for example lone white pixels are surrounded by black pixels, dilation will change the value of such "white" pixels to 0. Binary image 130 is also subjected to a flooding process, step 136, as shown for example in FIG. 8F. Also in broad conceptual terms, flooding highlights black or zero value areas which are surrounded completely by white or 1 value areas, and all else is flooded to white or a value of 1. This is beneficial because the central area of the test pattern being searched for includes isolated black and white areas. Erosion, dilation, and flooding are known in the art.

Figure 8E:
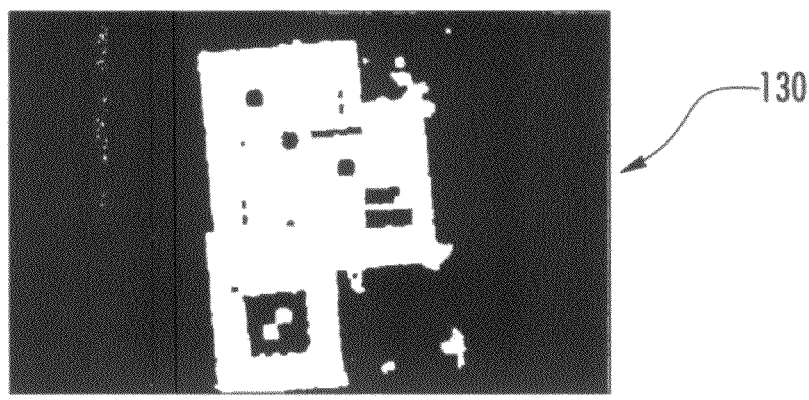
Figure 8F:
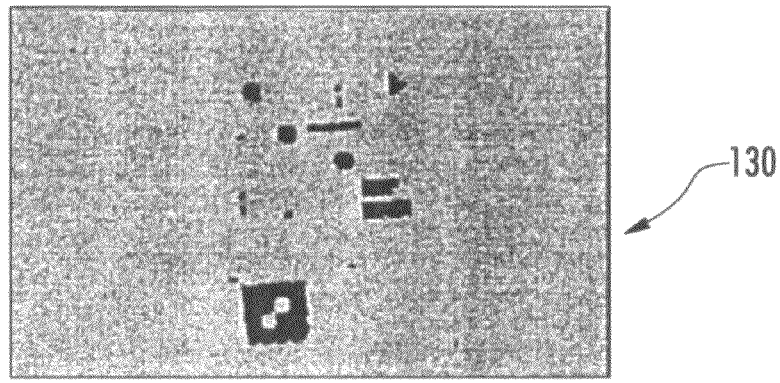
Figure 9:
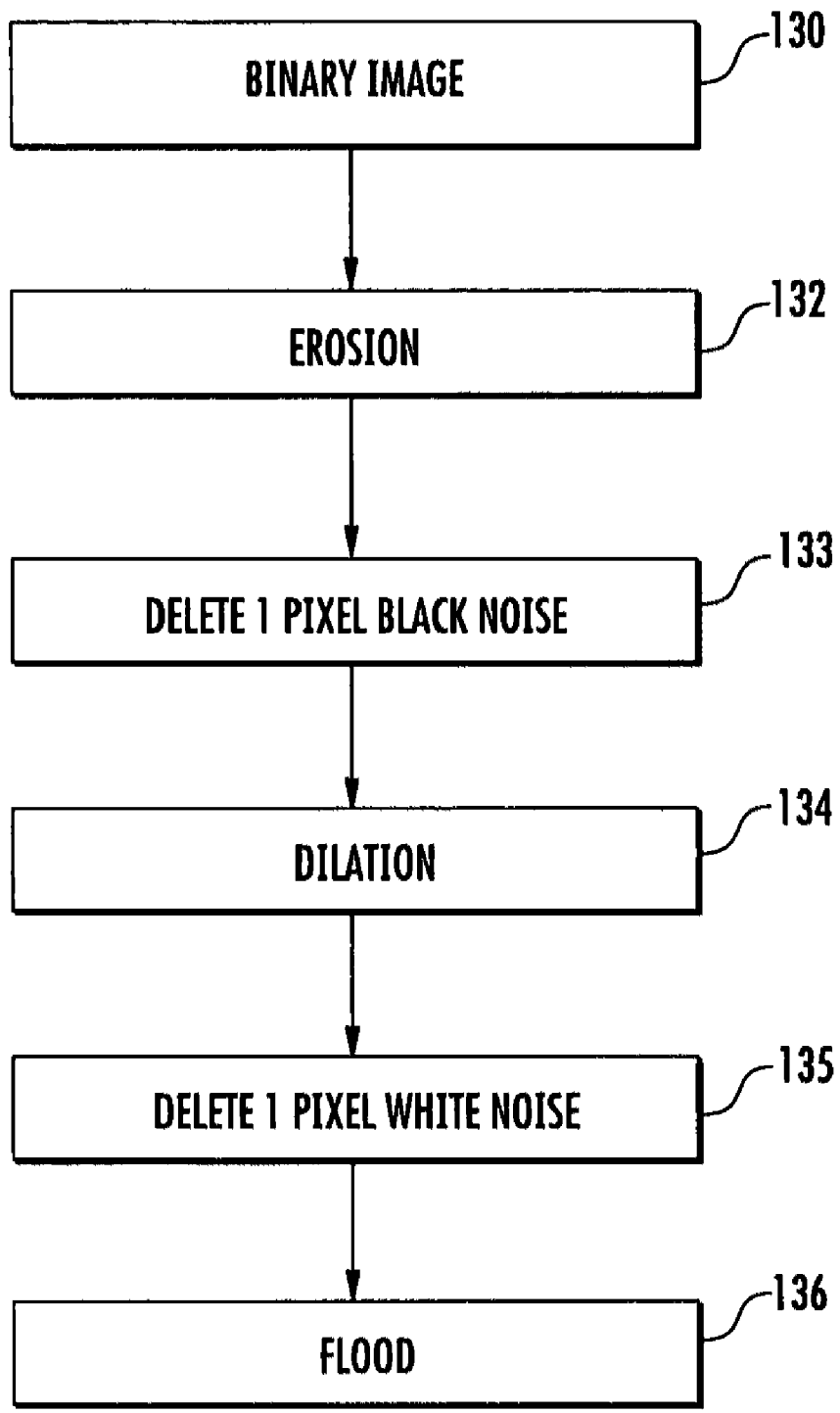
FIG. 9 is a flow chart depicting one example of a portion of the processing steps for finding and isolating an object such as a test pattern in accordance with the present invention.

In accordance with one aspect of the present invention, however, in order to speed up the process of identifying or finding the test pattern, further steps are included. Following erosion of the binary image, black noise is deleted, step 133, FIG. 9 or more accurately, the binary value of stray black pixels is changed from 0 to 1. One example is shown in FIG. 8C. Following dilation, step 134, white noise is deleted, step 135, or more accurately, the binary value of stray white pixels is changed from 1 to 0. One example is shown in FIG. 8E. As is shown in FIGS. 8A-F, erosion tends to shrink objects; dilation grows objects, the deletion of black and white noise cleans up the image and the flooding highlights the available objects. The flooded images are then processed to search and identify the test pattern. In one embodiment this includes a line by line scanning, where a line has a set pixel width. By subjecting the binary image to steps 130-136, there will be less false positives or potential test pattern candidates as an image area is scanned, such that finding or locating the actual test pattern is faster. FIG. 9 is an exemplary detailed flow chart of one portion of the process for the "Search for Object" block of FIG. 10, namely step 150.

Figure 10:
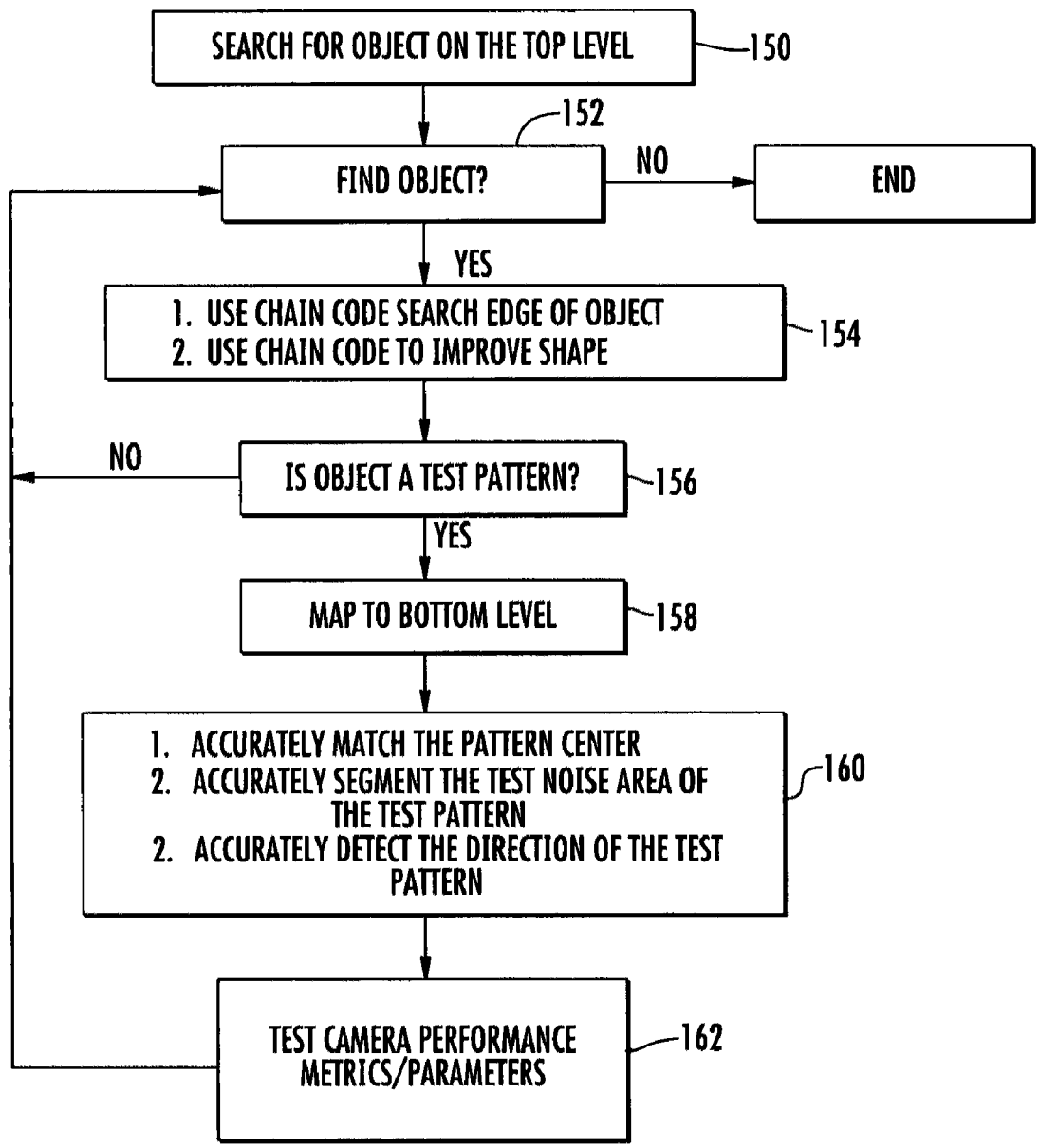
FIG. 10 is a flow chart depicting one example of the primary processing steps for identifying a test pattern and testing the camera's parameters in accordance with the present invention.

FIG. 10 is an exemplary flow chart of one overall process for identifying the test pattern and testing the camera's parameters in accordance with one embodiment of identification module 1030 of the present invention. As is shown in FIG. 10, identification module 1030 is configured to first search for the test pattern by searching for potential suitable test pattern candidates ("object") in the top level two-dimensional image, this two-dimensional image including a test pattern, and typically a parcel and background imagery surrounding the parcel, step 150, to find and identify the test pattern or object, step 152. In one configuration, after the binary (top level) image is generated, typically including setting the threshold level and cleaning the image as described above, searching for the object on the top level, step 150, also includes scanning the binary image. In one preferred example, every fourth line in the image is scanned. A suitable object for further investigation includes detection during scanning of a pixel in the two-dimensional image having a value of 1 (black).

After identifying such a suitable object or the test pattern, in one variation identification module 1030 is configured to utilize certain machine vision algorithms (e.g., Chain Code; see "A Conceptual Bug Marching Algorithm;" William K. Pratt, "Digital Image Processing," Chapter 18, pp. 623-625, Sun Microsystems, Inc. Mountain View, Calif. 1991, which is incorporated herein by reference) to search for the edges of the object and improve the shape of the object in the binary image, step 154. Among other things, the chain code algorithm creates a perimeter area surrounding a region of interest, which includes the object, as well as eliminating strays points or areas of noise.

Next, identification module 1030 is configured to determine whether the object that has been found or preliminary identified as a candidate may indeed be a test pattern, step 156. Step 156 typically includes scanning the bordered region of interest created by a chain code algorithm line by line searching for "lakes" or white areas, namely by searching for pixels having a value of 1 (white). If no pixels having a value of 1 are found by scanning, the area is considered noise and the values of all pixels within the bordered region of interest are converted to a 1 (white). If a "lake"—a pixel with a value of 1—is detected within the region of interest, the four corners of the region of interest are mapped to create an n×n pixel array.

Figure 11:
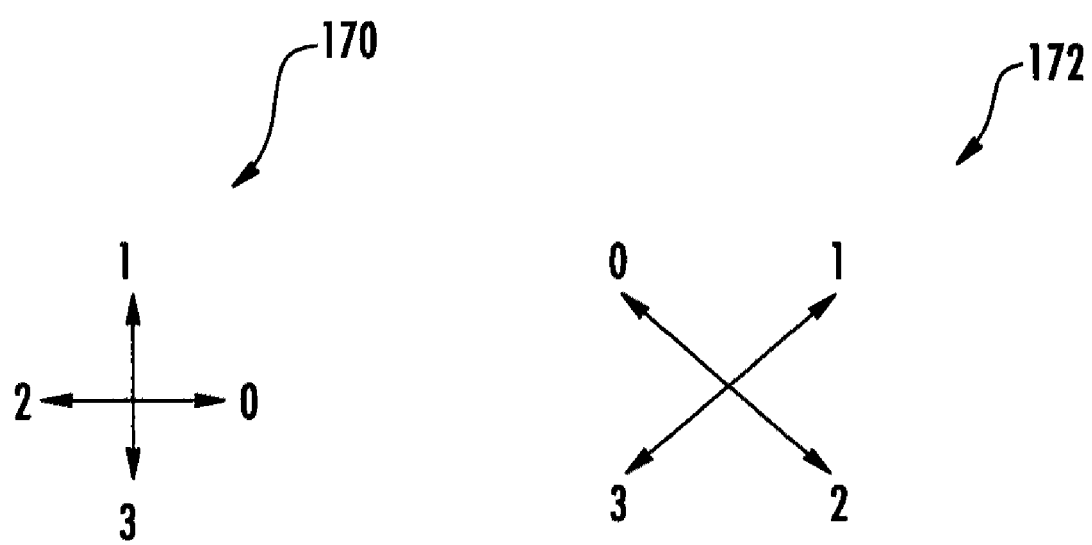
FIG. 11 is a schematic depiction of examples of chain code directions for use with one embodiment of the present invention.

In one non-limiting example, the x and y coordinates of the pixels of the four corners of the region of interest are determined using the so-called double box method, wherein each box is a simple four-direction chain code to provide a quick approximation of the object corners independent of the orientation of the object. First box 170, FIG. 11 is oriented at 0 degrees and second box 172 is oriented at 45 degrees. For each box (0 degrees and 45 degrees) the chain length ([maximum pixel value X−minimum pixel value X+maximum pixel value Y−minimum value Y]) is calculated. If the length (0 degrees) is less than length (45 degrees) then the 0 degree chain is used, otherwise the 45-degree chain is used, such that the box chain code orientation that most closely matches the object orientation (0 or 45 degrees) is chosen. In either case, the pixel coordinates for the four corners of the perimeter of the n×n pixel array including the object are derived from the chain code where the corners correspond to the minimum and maximum pixel coordinates along the chain, i.e. (minimum X, minimum Y) (maximum X, minimum Y) (maximum X, maximum Y) (minimum X, maximum Y).

Figure 12B:
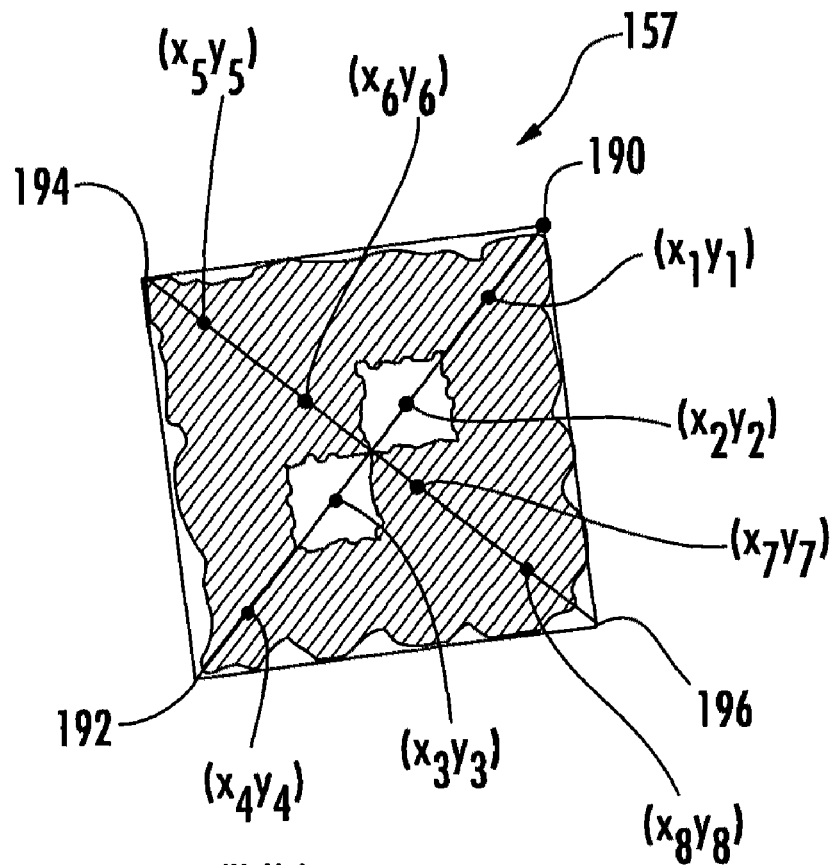
FIG. 12B is schematic depiction of an image of a region of interest such as the region of interest shown in FIG. 12A.
Figure 12A:
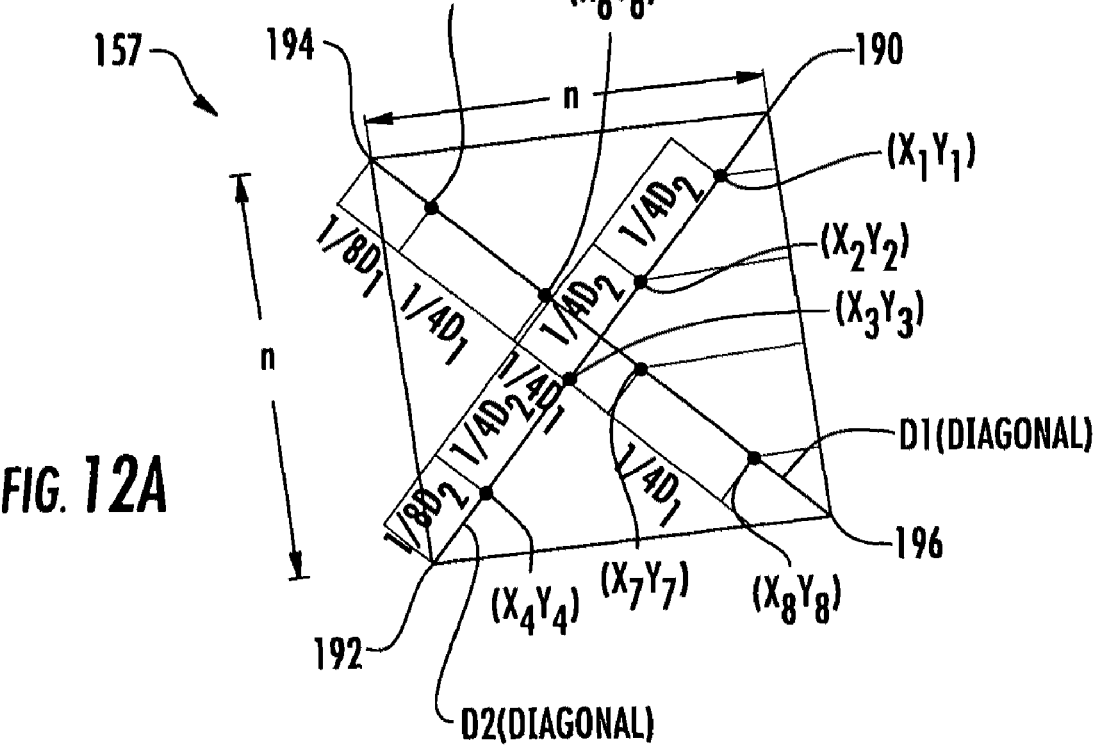
FIG. 12A is a highly schematic depiction of one example of a pixel array region of interest scanned to identify an object or test pattern in accordance with the present invention.

Next as part of step 156, n×n array 180, FIG. 12A signifying region of interest 157, FIG. 12B of an object or test pattern is scanned in one direction from first corner 190 to opposite second corner 192 (a "diagonal" scan D2) FIG. 12B and spaced feature points or pixels (four in one example (e.g. $(x_1, y_1)$, $(x_2, y_2)$, $(x_3, y_3)$, $(x_4, y_4)$)) along the scan line and within region of interest 157 are identified. The n×n array 180 is next scanned in another direction from third corner 194 to opposite fourth corner 196 (a "diagonal" scan D1 opposite the first "diagonal" D2 scan), and spaced feature points or pixels (e.g. $(x_5, y_5)$, $(x_6, y_6)$, $(x_7, y_7)$, $(x_8, y_8)$) along this second scan line and within the region of interest are identified. In one example, diagonal scans D1 and D2 are divided into eight (8) sections and feature points are chosen from within the eight (8) sections. In one configuration, determining if a viable candidate for the test pattern or the test pattern has been identified is verified if the feature points or pixels in one direction have white values between black values (e.g. 0, 1, 1, 0) and feature points or pixels in the other direction have all black values (e.g. 0, 0, 0, 0).

If it is determined that the object is indeed the test pattern (or at least a viable candidate), identification module 1030 is further configured to map the test pattern to the bottom level images, step 158, FIG. 10 and such mapping may be performed in ways known in the art. The test pattern that has been mapped to the bottom level image is then pre-processed step 160, before the image is used to test the camera's performance parameters by determining the various metrics described above, step 162.

Figure 13:
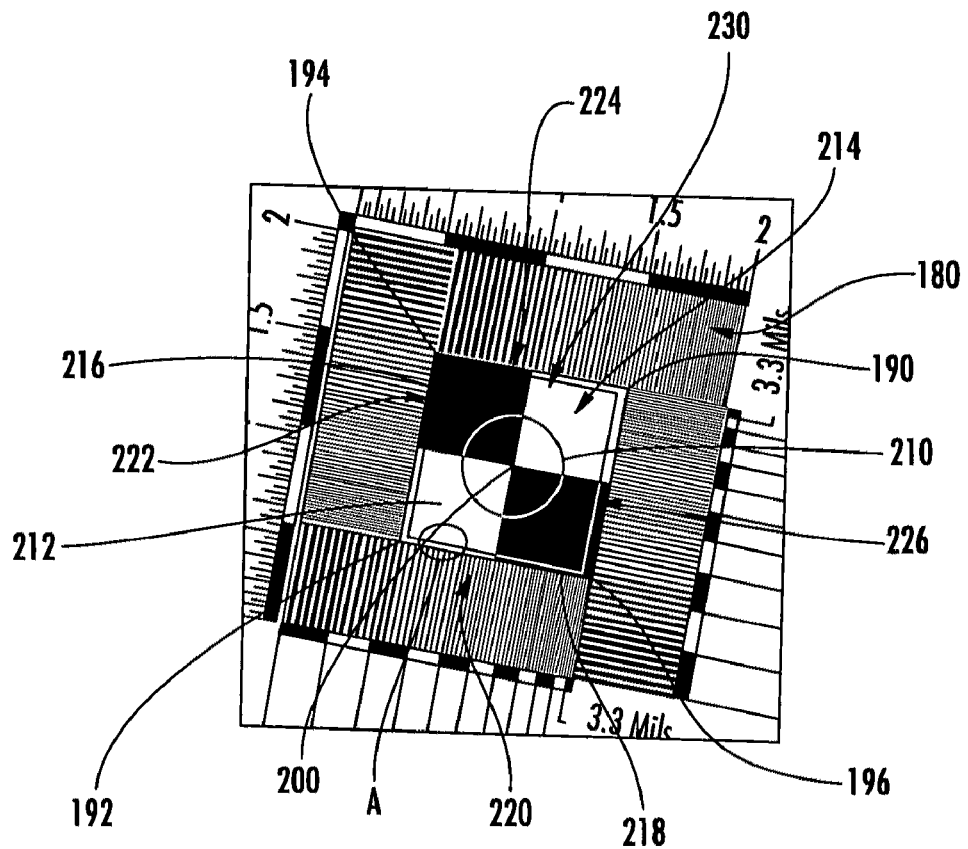
FIG. 13 is a schematic depiction of one example of a test pattern identified in accordance with the present invention.
Figure 13:
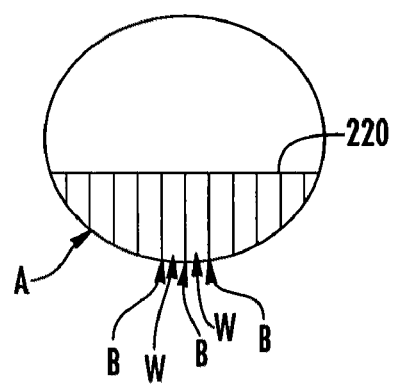

In accordance with one configuration of the subject invention, preprocessing module 1040, FIG. 1C is configured to pre-process the image, which typically begins with locating or finding center 200, FIG. 13 of region of interest or array 180 from the corner coordinates 190, 192, 194 and 196, after which circle 210 is drawn—which may be by ways known in the art—with center 200 serving as the center of the circle, thereby creating four quadrants 212, 214, 216 and 218, where two quadrants 212 and 214 are white and two quadrants 216 and 218 are black. The weight of each quadrant is determined, typically by counting the number of pixels in each quadrant, and if not all quadrants have an equal amount of pixels, center 200 is shifted accordingly. When the amount of pixels in each of four quadrants 212, 214, 216 and 218 is equal, the true center of region of interest or array 180 is set.

Pre-processing module 1040, FIG. 1C will also typically be further configured to segment each of the black and white sections of the contrast test area of the test pattern, which in one variation may be accomplished using a Chain Code algorithm such as the one described above. First, boundaries 220, 222, 224 and 226 of test pattern image area 230 (two white squares and two black squares) are determined by scanning from the true center in four directions until pixels in an alternating pattern of black, white, black, white are found, as shown in one sample area A. This signifies the beginning of i.e. the boundaries 220, 222, 224 and 226 or outside edges of test pattern image area 230.

After center 200, the associated true center, and the boundaries of the test pattern image area are found, pre-processing step 160, FIG. 10 may further include rotating the test pattern in order that it aligns with information from the image sensors (such as camera tunnel line scan cameras) concerning LPI (lines per inch) and DPI (dots per inch), since such information received is typically pertaining to a given angle. Various techniques known in the art for rotating may be used as desired for a particular application, such that the test pattern located in accordance with the subject invention is properly aligned with incoming LPI and DPI information.

Following pre-processing step 160, FIG. 10, performance parameters are tested, step 162, including but not limited to tests described herein, e.g. a Contrast Test, a General Noise test, and the like, test pattern images are collected and analyzed, and various image performance metrics are generated. Thereafter, the metrics may be compared to one or more threshold values and based on the results of the comparison, image quality settings may get adjusted to bring the performance within a desired range. Additionally, a further embodiment of the subject invention enables automatic adjustment of image quality settings for tested for metrics in order to improve the performance of a camera tunnel system.

Some of the analyses performed on the test pattern in accordance with the present invention to obtain information concerning image quality will now be described. The performance metrics described below can be computed for the test pattern using a combination various machine vision-related techniques as described more fully below. Machine vision techniques as used herein refer to techniques that encompass computer science, optics, mechanical engineering, and industrial automation. Machine vision techniques as used herein can include a number of different image processing techniques, including but not limited to: pixel counting to count the number of light or dark pixels; thresholding to convert an image with gray tones to simply black and white; connectivity and segmentation used to locate and/or count parts by differentiating between light and dark connected regions of pixels; blob discovery and manipulation used for inspecting an image for discrete blobs of connected pixels (e.g. a black hole in a grey object) as image landmarks, where the blobs can represent optical targets; barcode reading for decoding of one-dimensional (1D) and two-dimensional (2D) codes designed to be read or scanned by machines; optical character recognition (OCR) for the automated reading of text such as serial numbers; gauging for the measurement of object dimensions in inches or millimeters; edge detection for finding object edges; template matching for finding, matching, and/or counting specific patterns; recognition-by-components for extracting geometrical primitives from visual input; and robust pattern recognition used to locate an object that may be rotated, partially hidden by another object, or varying in size. A machine vision system, such as a camera tunnel system, can use a combination of these processing techniques to perform a complete inspection. For example, a system that reads a barcode may also check a surface for scratches or tampering and measure the length and width of a machined component.

Figure 14:
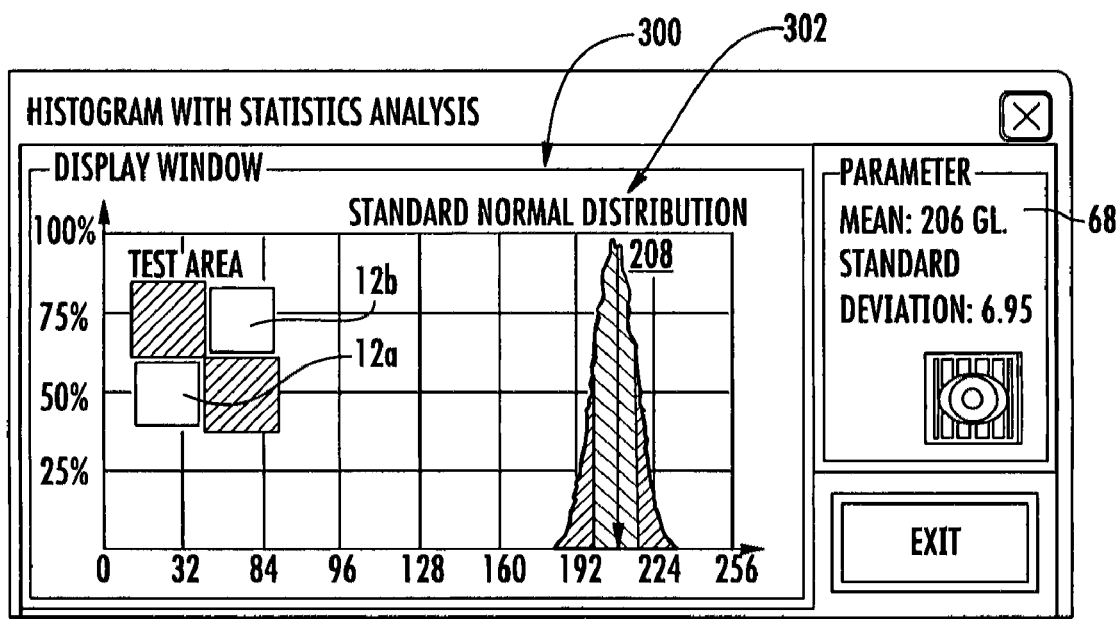
FIG. 14 is a schematic depiction of one example of an illumination histogram corresponding to illumination information in accordance with the present invention.

In one configuration, the Common Properties data group contains camera information on illumination, contrast, and general noise, as associated for example with buttons 68, 70 and 54, respectively, FIG. 4. An Illumination test in accordance with one aspect of the subject invention analyzes how well-lit the object (e.g. parcel and/or test pattern) in the image is. Usually the whiter the supposed white colors are, the better, but without reaching saturation. The output of the illumination test can be a gray level between 0 and 255, 0 being black and 255 being white. White values too close to 255 can result in lost contrast and hence lost image detail due to overexposure of the image. In general, white levels are desired around 200 to 220. Clicking Illumination button 68 can display histogram chart 300, FIG. 14, with distribution of gray levels 302 in selected white areas of the test pattern image, namely, two center white squares 12a, 12b, FIG. 1A, which can be reproduced in schematic form as shown in FIG. 14. The computed and displayed illumination value 304, FIG. 4 can be determined by the mean value for a standard normal distribution. For non-standard distributions, the output can be determined by the peak gray level.

Figure 15:
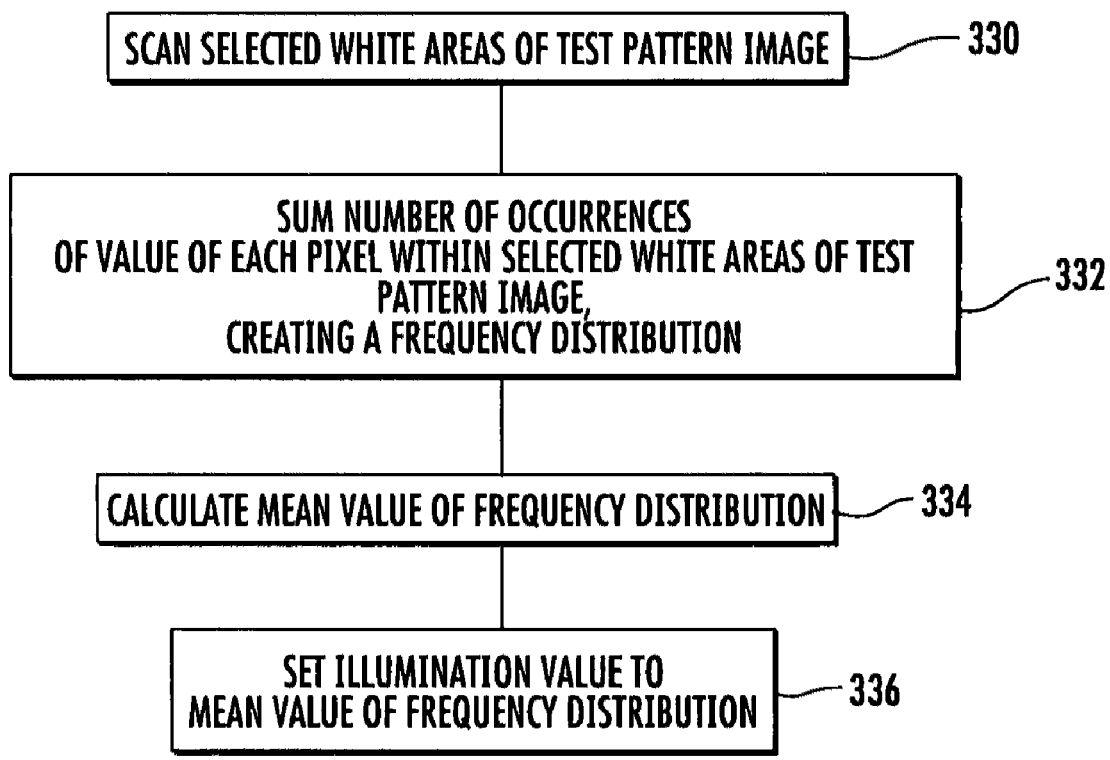
FIG. 15 is a flow chart depicting one example of the primary processing steps for an illumination test in accordance with the present invention.

In accordance with one configuration of the present invention, therefore, analyzing the image of the test pattern for generating an image quality metric in accordance with the subject invention typically includes generating an illumination value or metric. In one variation, illumination module 1045, FIG. 1C is configured to conduct an illumination test and to generate an illumination value, which includes testing each of the white areas 12a and 12b, FIG. 1A of centrally located contrast test area 12, step 330, FIG. 15, for example by scanning. Then for each pixel within white areas 12a and 12b, summing the number of occurrences of the value of each pixel (e.g. 0-255, but typically much closer to 255 than 0 since the areas are white) to create a frequency distribution, step 332, calculating the mean value for the distribution, step 334, and setting this mean value to illumination value 304, step 336.

One advantage of the automatic generation of an illumination value in accordance with the present invention is that it provides continuity and consistency. Currently known systems require an operator to choose a white area out of a test image, for example, which interjects subjectivity into the image analysis. With the subject invention, this subjectivity can be eliminated. As noted above, for most applications white area pixel values in the range of 200-220 are typically preferred. Thus a contrast value of 240 for example will alert the system operator that the image is overexposed, thus eliminating subjective analysis.

Figure 16:
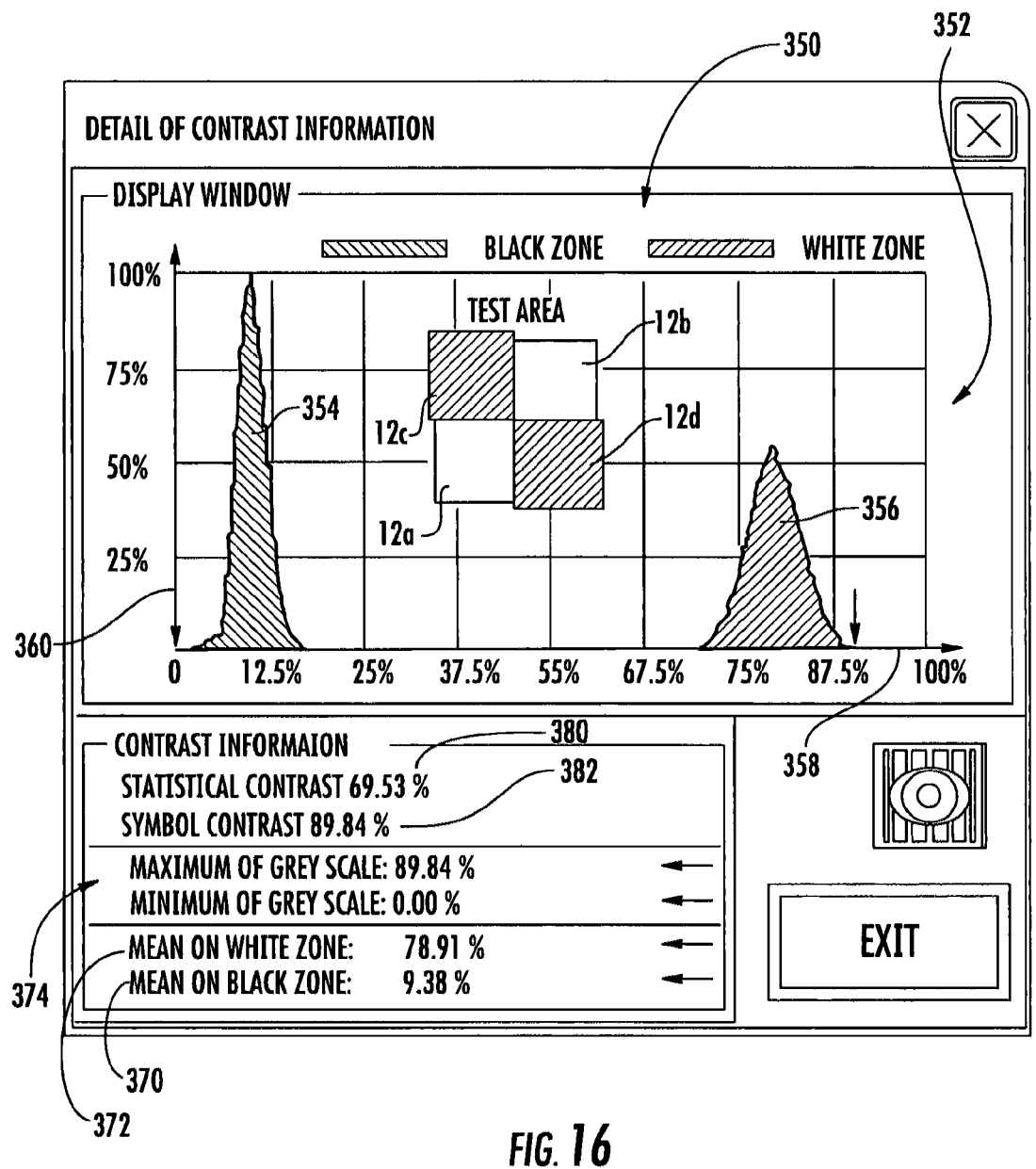
FIG. 16 is a schematic depiction of one example of a contrast histogram corresponding to contrast information determined in accordance the present invention.

A Contrast test in accordance with one aspect of the present invention analyzes the difference between the image's black level and white level. Since the test pattern is only black and white, a high contrast level makes it easier for a camera tunnel system to distinguish edges. Output 320, FIG. 4 of the contrast test can be a percentage value between 0% and 100% where, 0% is no contrast and 100% is maximum contrast. Clicking contrast button 70 can display detailed contrast information. As is shown in FIG. 16, for example, the detail of contrast information can be histogram chart 350 with a distribution of gray levels 352 in selected areas of test pattern image 12, FIG. 1A, namely four (4) center squares 12a, 12b, 12c, 12d (two white, two black), which can be reproduced in schematic form as shown in FIG. 16. The pixel value distribution 354 for black squares 12c, 12d appears toward the left on the histogram; the pixel value distribution 356 for white squares 12a, 12b appears toward the right of the histogram. Horizontal axis 358 of histogram 350 is the percentage representation of the gray scale from 0 to 255. Vertical axis 360 is the level of occurrence as a percentage. The means of the black-level distribution 370 and white-level distribution 372, respectively, appear at the bottom of contrast window 374. Statistical contrast value 380 and symbol contrast value 382 also may be shown along with histogram 350. Symbol contrast value 382 is the difference between the maximum white level and the minimum black level. Statistical contrast value 380 is the difference between mean value of the white level distribution 372 and the mean value of the black level distribution 370. Contrast value 380 is therefore output contrast value 320 as shown in FIG. 4 resulting from a contrast test. Contrast value 320 is typically a value of interest to, e.g. a camera tunnel system operator.

Figure 17:
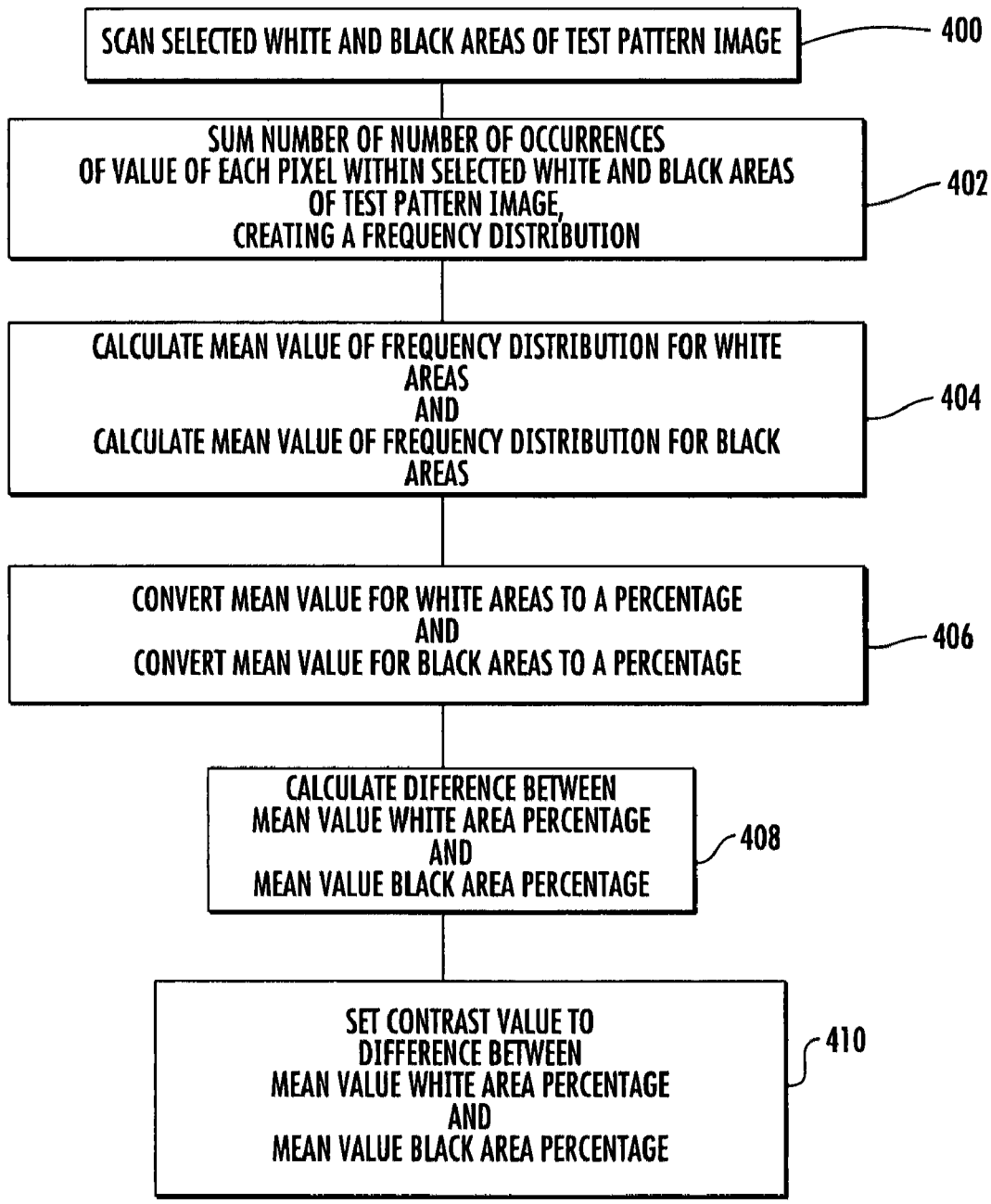
FIG. 17 is a flow chart depicting one example of the primary processing steps for a contrast test in accordance with the present invention.

In accordance with one configuration of the present invention, therefore, analyzing the image of the test pattern for generating an image quality metric in accordance with the subject invention also typically includes generating a contrast value or metric. In one variation, contrast module 1050 is configured to conduct a contrast test and generate a contrast value, which includes testing each of the white areas 12a and 12b, FIG. 1A and each of the black areas 12c and 12d of centrally located contrast test area 12, step 400, FIG. 17, for example by scanning. Then for each pixel within white areas 12a and 12b, and for each pixel within black areas 12c and 12d, summing the number of occurrences of the value of each pixel to create a frequency distribution, step 402, and calculating the mean value for the white distribution and the mean value for the black distribution, step 404. Next, the mean value for white distribution is converted to a percentage value 372, FIG. 16 (mean value/255*100), and the mean value for the black distribution is converted to a percentage value 370, (mean value/255*100), step 406, FIG. 17. Generating the contrast value also includes calculating the difference between white distribution percent mean value 372 and black distribution percent mean value 370, step 408, and setting this value to contrast value 380, FIG. 16, step 410, FIG. 17.

Figure 18:
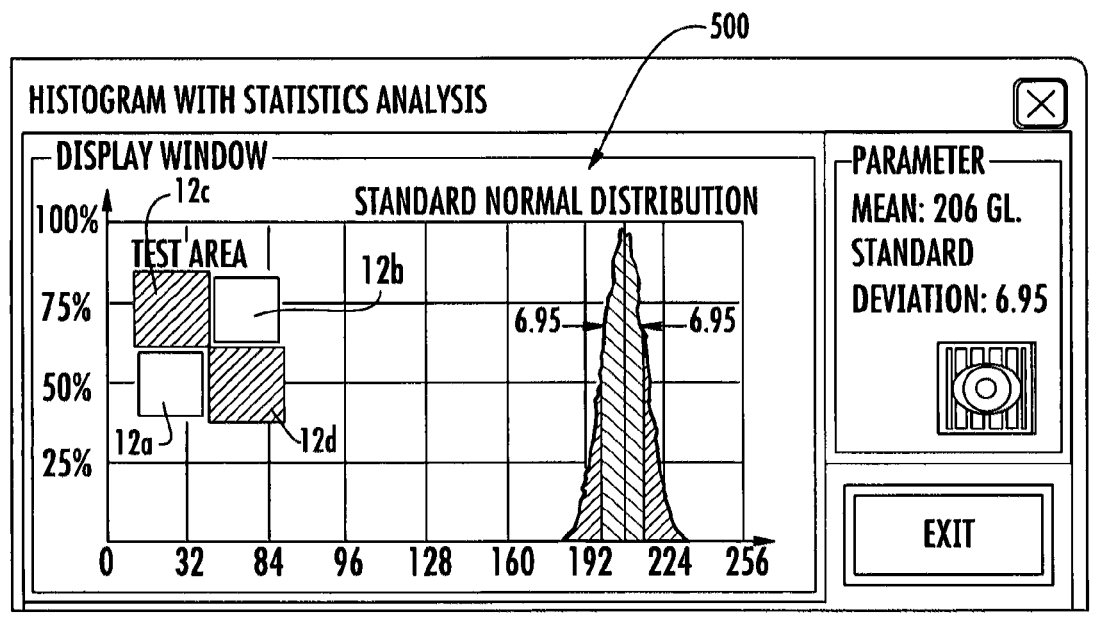
FIG. 18 is a schematic depiction of one example of a histogram corresponding to general noise information in accordance with the present invention.

General noise is the deviation in gray level from the actual gray level of an area. Noise can have an adverse effect on the camera analysis if the noise level is too large. In accordance with one aspect of the subject invention, a General Noise test determines and outputs the gray level deviation value from the peak occurrence gray level, in one variation by analyzing General Noise in two ways, such that Noise[W], as associated for example with button 53, FIG. 4, represents the distribution of gray levels in selected areas of test pattern image 12, FIG. 1A, namely, two center white squares 12a, 12b, which can be reproduced in schematic form as shown in FIG. 18. Noise[B], associated in one example with button 74, FIG. 4, is the distribution of gray levels in the two center black squares 12c, 12d of the test pattern image. A user by clicking either the Noise[W] or the Noise[B] button can view a histogram with statistics analysis graph 500, FIG. 18 for example. When histogram 500 displays a standard normal distribution curve, the deviation is one standard deviation from the peak occurrence gray level. When the graph is not a standard normal distribution curve, the deviation is determined by taking the gray level that occurs at some proportion (e.g., 60%) of the peak occurrence gray level and finding the difference between those two numbers.

Figure 19:
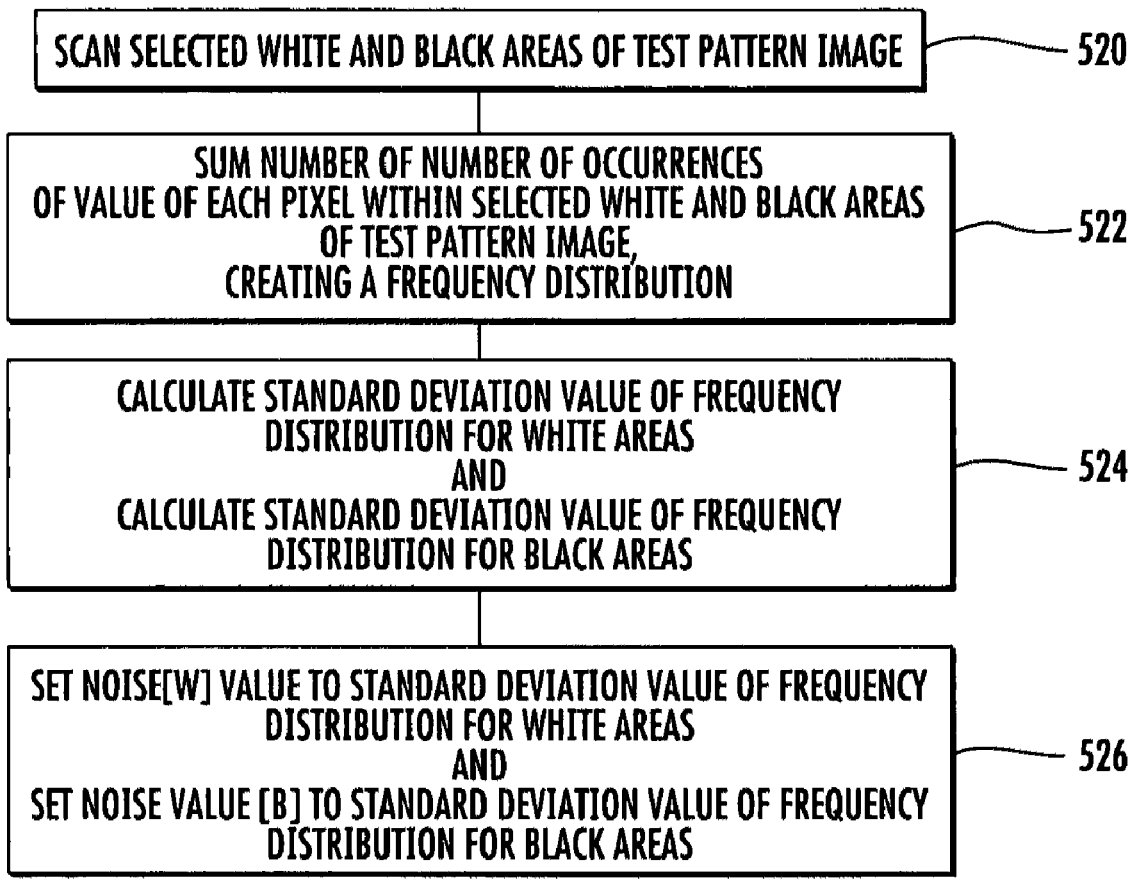
FIG. 19 is a flow chart depicting one example of the primary steps for a general noise test in accordance with the present invention.

In accordance with one configuration of the present invention, therefore, analyzing the image of the test pattern for generating an image quality metric in accordance with the subject invention also typically includes generating general noise values or metrics. In one variation, general noise module 1060 is configured to conduct a general noise test and to generate general noise values, which includes testing each of the white areas 12a and 12b, FIG. 1A of centrally located contrast test area 12, step 520, FIG. 19, for example by scanning. Then for each pixel within white areas 12a and 12b, and for each pixel within black areas 12c and 12d, summing the number of occurrences of the value of each pixel to create statistical analysis graph 500 representing frequency distribution, step 522, calculating the standard deviation for the white distribution and the standard deviation for the black distribution, step 524, and setting Noise[W] (e.g. value 153 shown in FIG. 4) to the standard deviation value for the white distribution, and setting Noise[B] 154 to the standard deviation value for black distribution, step 526.

Noise values beyond a desired range are indicative of high noise levels, which may interfere with proper image analysis. Thus high noise values, e.g. values for Noise[W] and/or Noise[B], will alert a system operator of the presence of difficulties in the system which may cause increased noise, leading to investigation and potential remedy.

Figure 20:
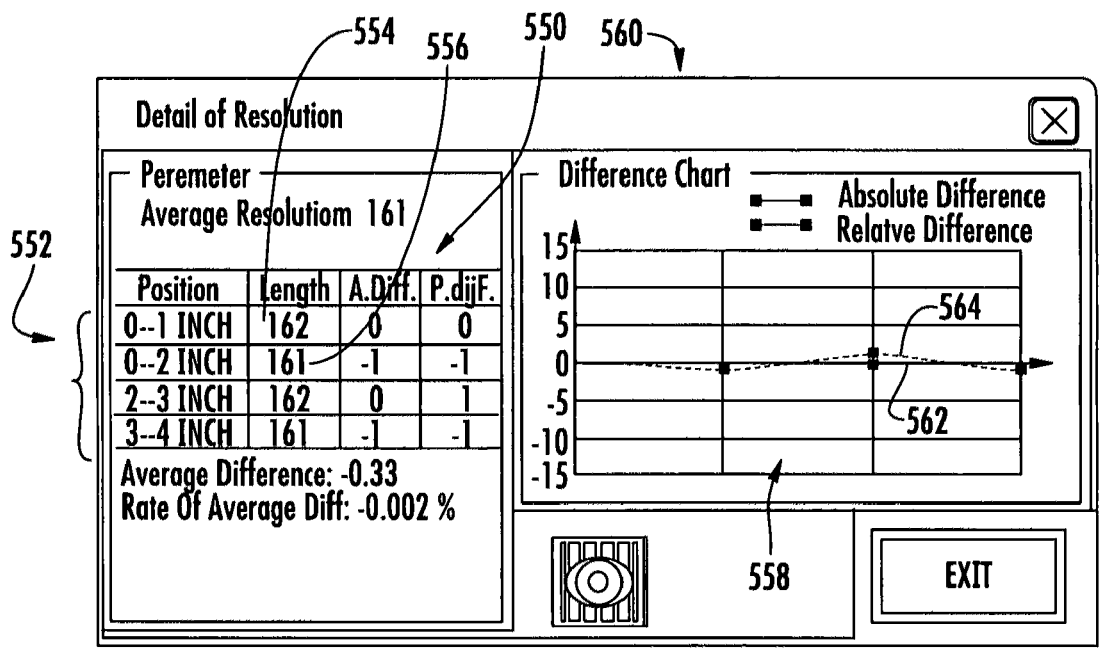
FIG. 20 is a schematic depiction of one example of a table corresponding to detail resolution information in accordance with the present invention.

The Horizontal Properties (Camera) data group provides information to the user or operator regarding resolution, focus, and high-frequency noise, as associated for example with buttons 72, 56 and 57, respectively, FIG. 4. Resolution measures pixels per inch, providing an indication of the actual size of the image. In accordance with one aspect of the present invention, a Resolution test provides and outputs a number for the width in pixels of one inch of the image on the horizontal edge and a number for the width in pixels of one inch of the image on the vertical edge. Clicking Resolution button 72 can display table 550, FIG. 20 that contains results for tests on machine-readable ruler scale 16, FIG. 1 for pixel size of the length of the ruler on the horizontal and/or vertical edges, as shown in FIG. 20. A Resolution test in accordance with one aspect of the invention breaks the ruler down inch by inch, then measures the length in pixels for every inch as shown at 552. If the image is tilted, a right triangle formula can be used to solve for length. This breakdown may be and typically is preformed for every inch-wide section in machine-readable ruler scale 16, and it may take the average, and/or it may find the difference between the sections.

When the difference between each inch-wide section is too large on the vertical axis, however, it could mean that the belt movement is irregular. In the example shown, length in pixels 554 (i.e. 162 pixels) for 0-1 inch is not significantly different from length in pixels 556 (i.e. 161 pixels) for 1-2 inches, and so forth, providing an indication that belt movement is satisfactory. Graph 558 on the resolution window 560 displays graphically the difference between pixel widths per inch-wide sections. This graph as shown includes two curves: absolute difference curve 562 and relative difference curve 564. Absolute difference curve 562 displays the difference of each pixel width from the first width. Relative difference curve 564 displays the difference of each pixel width from the one preceding it. The presence of sharp peaks or spikes would provide an immediate visual indication of a discrepancy between each one inch increment, thus flagging a system problem.

In accordance with configuration of the subject invention, therefore, analyzing the image of the test pattern for generating an image quality metric in accordance with the subject invention also typically includes generating resolution values. One such resolution value, as shown for example in FIG. 4 at 570, is the average length in pixels per inch on the test pattern image. Typically, an average of the pixel widths is calculated, a difference ratio found to be acceptable is determined, and an average pixel length of an inch of space is set as the output.

Figure 21:
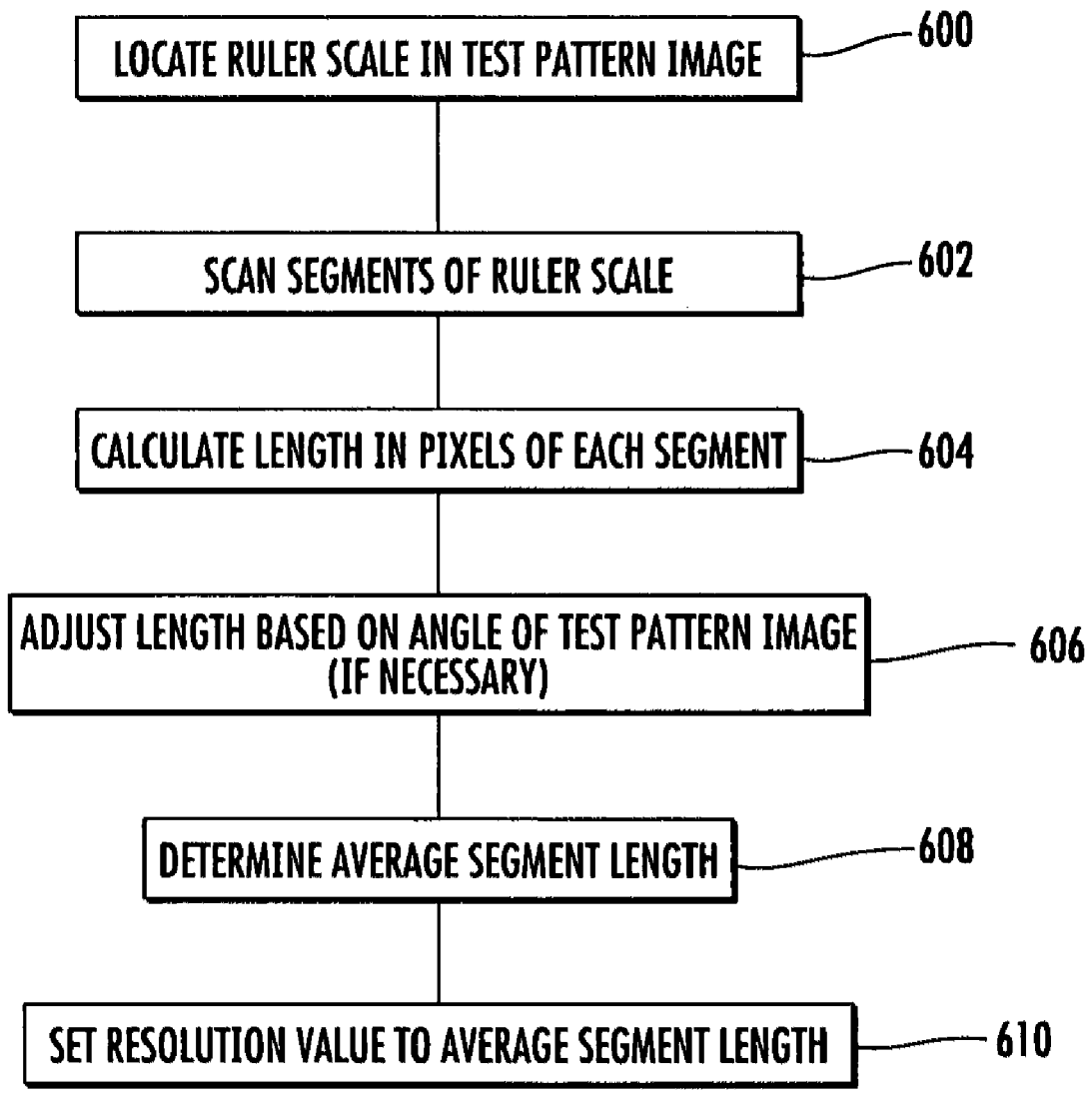
FIG. 21 is a flow chart depicting one example of the primary processing steps for a resolution test in accordance with the present invention.

In one variation, after the center of the test pattern image has been found as described above herein for example, resolution module 1070, FIG. 1C is configured to conduct a resolution test and to generate resolution values, which includes locating or identifying machine readable ruler scale 16 in the test pattern image and defining its borders 16a, 16b (e.g. as shown in FIG. 1), step 600, FIG. 21, by scanning outward from the center of the test pattern image. Location or identification of the machine readable ruler scale and its borders, as well as the subsequent determination of resolution values, will presently be described with respect to a machine readable ruler scale on one side of the test pattern image. It will be understood, however, that locating or identifying the scale preferably includes locating or identifying each scale by scanning in each direction from the center of the test pattern image, and calculating resolution values preferably includes determining such values for each side of the test pattern where the machine-readable ruler and ruler scales are present.

In one configuration, the location of the machine readable ruler scale is determined by changes in the frequency of white and black pixel values as a scan proceeds from the center of the test pattern image to the outside, which results from the varying patterns in the test pattern image. After locating the machine-readable ruler scale and defining its borders, each segment of machine-readable ruler scale 16 (preferably both horizontal and vertical scales) FIG. 1A is scanned, step 602, FIG. 21, the length of each segment of machine-readable ruler scale in pixels is calculated, step 604, and the length is adjusted based on the angle of the test pattern if necessary, step 606. Next, an average segment length is determined (preferably for both horizontal and vertical scales), step 608, and resolution value e.g. 570, FIG. 4, is set to the average segment length, step 610, FIG. 21. In another variation, the resolution value may be compared to the known DPI of the system for the particular application, and an alert may be communicated to the operator if the difference is beyond a predetermined value.

Since poor resolution could lead to poor image quality analysis, a Resolution test in accordance with the subject invention is another test by which the quality of image analysis may be assessed.

Focus measures the sharpness of the image. The sharper the image, the easier it is for camera tunnel system to read the image's barcode. Clicking Focus button 56, FIG. 4 can display Detail of Focus table or screen 700, FIG. 22. In accordance with one aspect of the present invention, a Focus test outputs a minimum bar (code) width, horizontally and vertically oriented, that a camera tunnel system can read in Mils, or one thousandths of an inch. Detail of Focus table 700 displays an edge contrast ratio of the bars and spaces for each focus area section 14, FIG. 1A of test pattern image 10. A threshold edge contrast ratio separates the bars the camera tunnel system can read and the bars that it cannot accurately distinguish from adjacent spaces. That threshold value can be 15% in one example. The decoding of the barcode is considered degraded, or at least more difficult, below the threshold value. In other words, the reading or the decoding of the barcodes is rather less than optimal, while still possible and even rather common below the threshold value.

Figure 22:
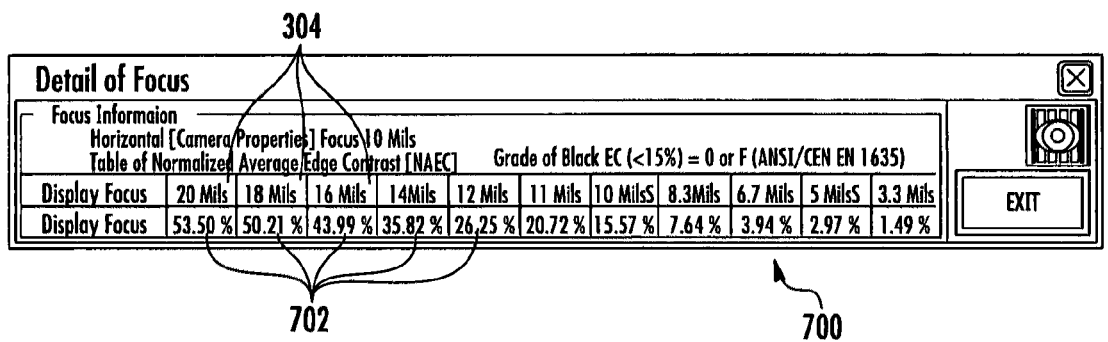
FIG. 22 is a schematic depiction of one example of a table corresponding to detail of focus information in accordance with the present invention.

Each focus area 14 on the test pattern image contains an array of different bar widths that is broken up by sections ranging from 3.3 Mils to 20 Mils. The section of the focus area with contrast ratio just above the threshold value (e.g., 15%) is the section with the minimum bar width that can be detected. Edge contrast ratio 702, FIG. 22 in mils for various bar widths is the output of the Focus test. The Focus test can find this value for both the horizontal bar sections and the vertical bar sections. In the example of FIG. 22, it can be seen that the minimum bar width that can be detected is 10 mils if the threshold value is 15%.

Figure 23A:
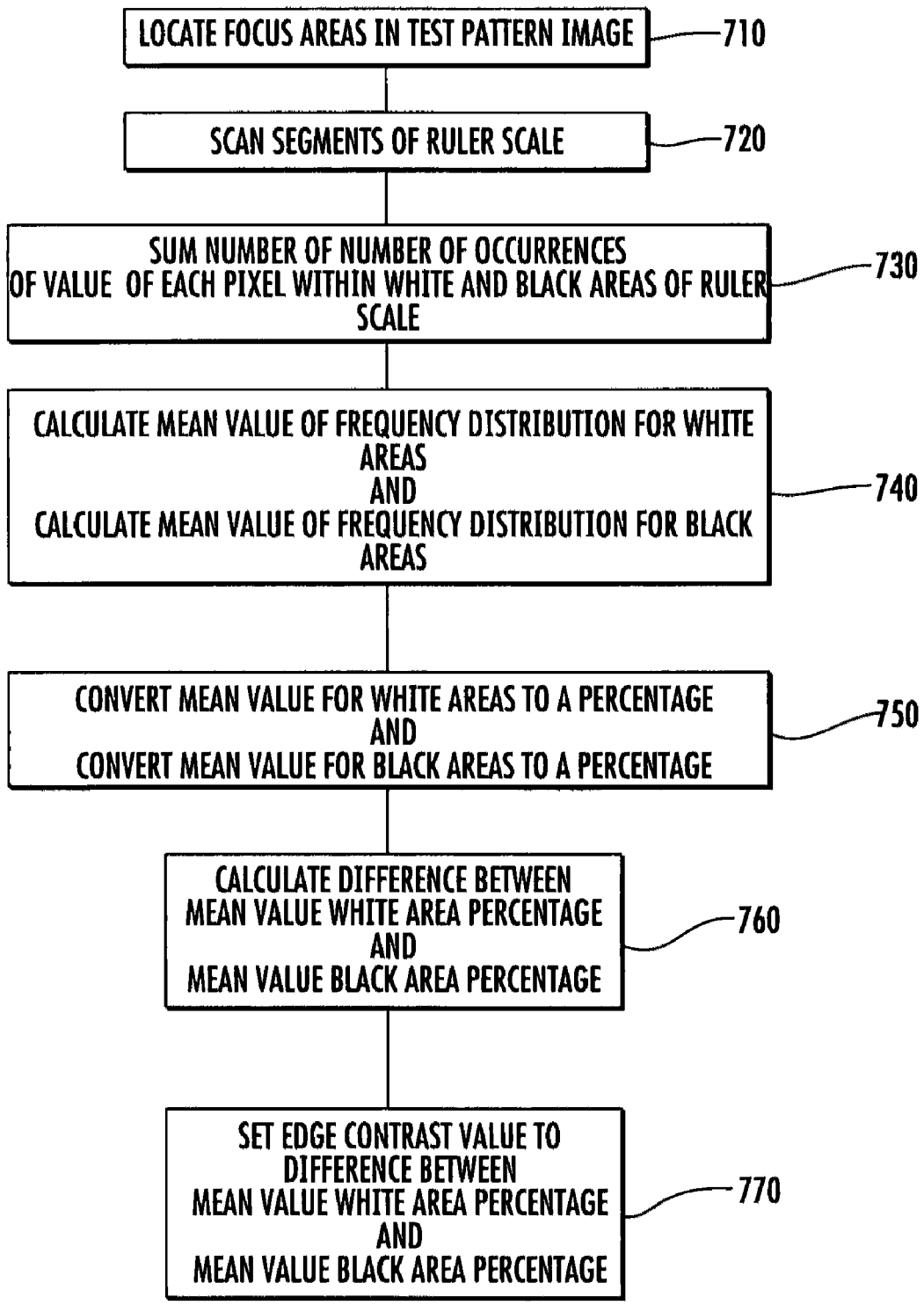
FIG. 23A is a flow chart depicting one example of the primary processing steps for a focus test in accordance with the present invention.

In accordance with one configuration of the subject invention, therefore, analyzing the image of the test pattern for generating an image quality metric in accordance with the subject invention also typically includes generating an edge contrast ratio for various bar width in the test pattern image. In one variation, after the center of the test pattern image has been identified as described above herein for example, focus module 1080, FIG. 1C is configured to conduct a focus test and to generate edge contrast (focus) ratio values, which includes locating or identifying focus areas 14 in the test pattern image, step 710, FIG. 23A, by scanning outward from the center of the test pattern image, step 720. Location or identification of the focus areas in the test pattern image, as well as the subsequent determination of resolution values, will presently be described with respect to a single focus area. It will be understood, however, that locating or identifying the focus area preferably includes locating or identifying each focus area by scanning in each direction from the center of the test pattern image, and calculating edge contrast ratio values preferably includes determining such values for each focus area present on the test pattern.

After locating the focus area in the test pattern image, the machine-readable ruler scale area adjacent to the focus area is scanned and each pixel value within white and black areas is summed, step 730 to create a frequency distribution. Next, edge contrast along a scan line through the focus area is determined, and thereafter the edge contrast ratio is calculated much like the contrast value described above. The mean value for the white distribution and the mean value for the black distribution within the associated focus area is calculated, step 740, the mean value for white distribution is converted to a percentage value (mean value/255*100), and the mean value for the black distribution is also converted to a percentage value (mean value/255*100), step 750. Generating the edge contrast ratio also includes calculating the difference between white distribution percent mean value and black distribution percent mean value in the machine readable ruler scale, step 760 and setting this value to edge contrast ratio value, step 770, for each length of black and white areas of the ruler scale, which vary from 3.3. mils to 20 mils as shown in FIG. 1A. In addition, as with all metrics or values, the edge contrast ratio value (for any or all focus areas) may be displayed to the user or operator of a camera tunnel system.

Figure 23B:
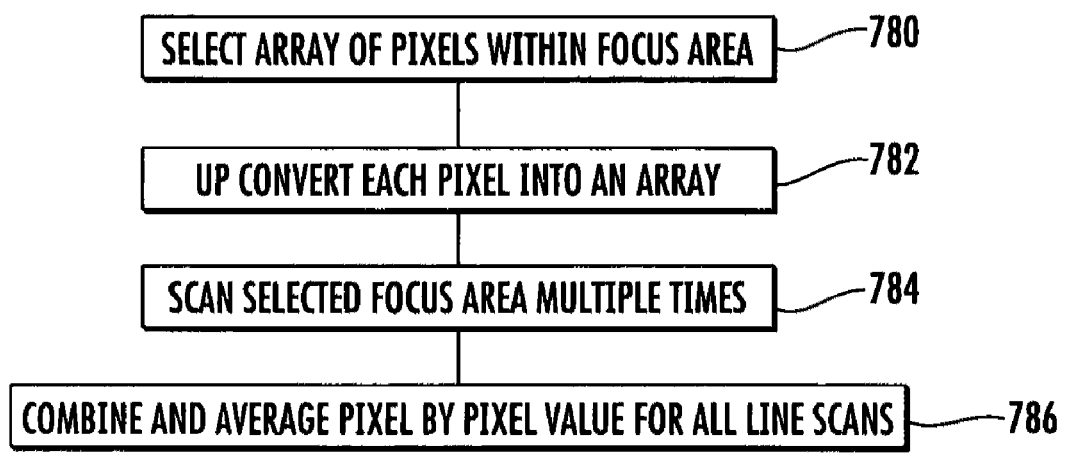
FIG. 23B is a flow chart depicting one example of the primary processing steps for enhancement in connection with a focus test in accordance with one aspect of the present invention.

Although the focus areas located through scanning as described above may be utilized as found, in one variation, prior to calculating the edge contrast, the focus area may be enhanced. In one example, enhancement includes selecting an array of pixels from portion of a focus area 14, FIG. 1A of the test pattern image, step 780, FIG. 23B, and up converting each pixel to an array such as a 4×4 array (thereby making the area 16 times larger), step 782. In one variation, each pixel is up converted using its neighboring pixels above, below and diagonally. Next, this selected focus area is scanned multiple times, step 784, and multiple scan lines (e.g. 15 scans) through this focus area are combined and averaged, step 786. In one example, a first scan line is made through the middle of the focus area, with subsequent scans on either side of this initial scan, and the average is determined by taking scan lines (e.g. seven (7) scan lines on either side of the initial scan line), calculating a pixel by pixel illumination value for all line scans, and averaging those values.

In accordance with this aspect of the invention, the operator is provided with an edge contrast ratio such that the operator can readily see a minimum bar code width in Mils which the camera tunnel system can read satisfactorily.

The High Frequency (gradient/pp) Noise metric or test is another test which may be used to measure the amount of noise in an image, in addition to the General Noise test. The noise that the eye can see is the sudden spikes in gray level as the eye scans through an image. In accordance with one aspect of the present invention, the High Frequency Noise test measures the height of gray level spikes in order to give a more precise noise level calculation than by simply taking an average, as with General Noise. In one variation, the High Frequency Noise test can analyze High Frequency Noise in two ways, namely Noise[W] and Noise[B]. As discussed above, Noise[W] is the distribution of gray levels in the two center white squares of the test image; and Noise[B] is the distribution of gray levels in the two center black squares of the test image. With the High Frequency Noise Test, however, clicking either the Noise[W] button 58, FIG. 4 or the Noise [B] button 59 displays a three-dimensional graph or graphs of the results of the High Frequency Noise test, corresponding to Noise[W] and Noise[B] respectively. Clicking Frequency Noise may also display boxes that the High Frequency test measures in a small box and the direction of the analysis as an arrow in the center of the boxes. The High Frequency Noise test allows the user to move the small rectangle to obtain a three-dimensional noise graph for any point in the image.

In one variation high frequency noise module 1100, FIG. 1C is configured to conduct a high frequency noise test and to calculate and output the average change in gray level on the horizontal axis or the vertical axis over the area of the square measured (delta gray level/pixels squared or g/pp) as shown for example at 780, FIG. 4, in accordance with the High Frequency Noise test, by scanning through the horizontal or vertical axis of the boxes line by line and find the average change in gray level of each line, and then average that number over the area of the box measured. The concept of High Frequency Noise can be better explained by way of an analogy. For example, given a black box with a few white dots over it, if one were to measure the average gray level and find the standard deviation, the white dots would be ignored. However, if the High Frequency Noise method is used the change in gray level from pure black to pure white is very large, which can affect the analysis. The High Frequency Noise test thus can provide another level of indication of image quality analysis. Typically, however, if the General Noise test described above results in values which indicate high noise levels, it is an indicator of a difficulty in the overall camera tunnel system.

Vertical Properties analyses in accordance with the subject invention, as associated with button 66, FIG. 4, are essentially the same as the analyses of the Horizontal Properties described above, except that they are done for the direction orthogonal to the horizontal ones. As used herein, the terms horizontal, vertical, right, left and diagonal are meant to be relative only, and when used in association with the test pattern or image, are not meant to be limiting as will be understood by those skilled in the art. Also, it should be realized that many alternative or additional metrics of image quality can be used to provide a measure of system quality, and that the embodiments of the present invention are not limited solely to the metrics described above.

Figure 24:
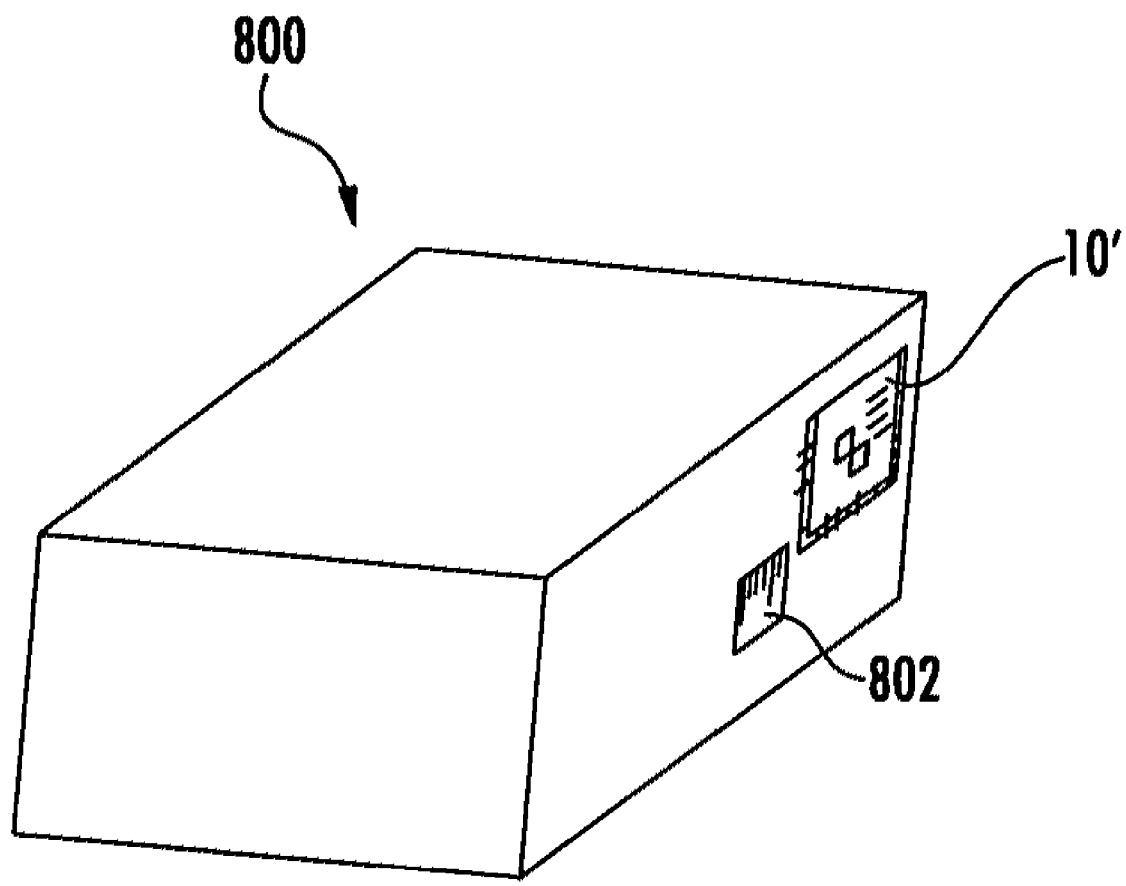
FIG. 24 is a highly schematic three-dimensional perspective view of a test item or parcel and barcode for use with one aspect of the present invention.

In many instances, a camera tunnel system operator will either print out or be provided with a test pattern, affix it to a package, and run the test parcel to test image quality in accordance with the invention before or in between running a multitude of packages for sorting. In accordance with another aspect of the present invention, however, in addition to affixing test pattern 10', FIG. 24 of the subject invention to test parcel 800, symbol 802 is also affixed to the parcel, including e.g. a barcode, an optical character verification symbol and/or a radio frequency identification (RFID) tag or the like, any of which is read by decoder system 1006. Decoder subsystem 1006 is also configured to generate a signal based on the symbol. Image analysis tool 1010 is responsive to the signal and configured to save the test pattern image, and to commence identification and analysis of the saved test pattern image. Thus, image analysis tool 1010 can save the test pattern image of test pattern 10' and/or the parcel image in memory for later use, such that testing and analysis of test pattern 10' as described herein may be performed during a live sort without stopping the camera tunnel system. In one example, the identification module 1030 of image analysis system 1010 is responsive to signal 804, configured to save the test pattern image, and then commence identifying and analyzing test pattern 10' as described.

Additionally as noted above, in another embodiment image analysis tool 1010, FIG. 1B includes automatic adjustment subsystem or module 1140, configured to automatically adjust image quality settings of the camera, so as to improve camera performance and the overall performance of the camera tunnel system.

Figure 25:
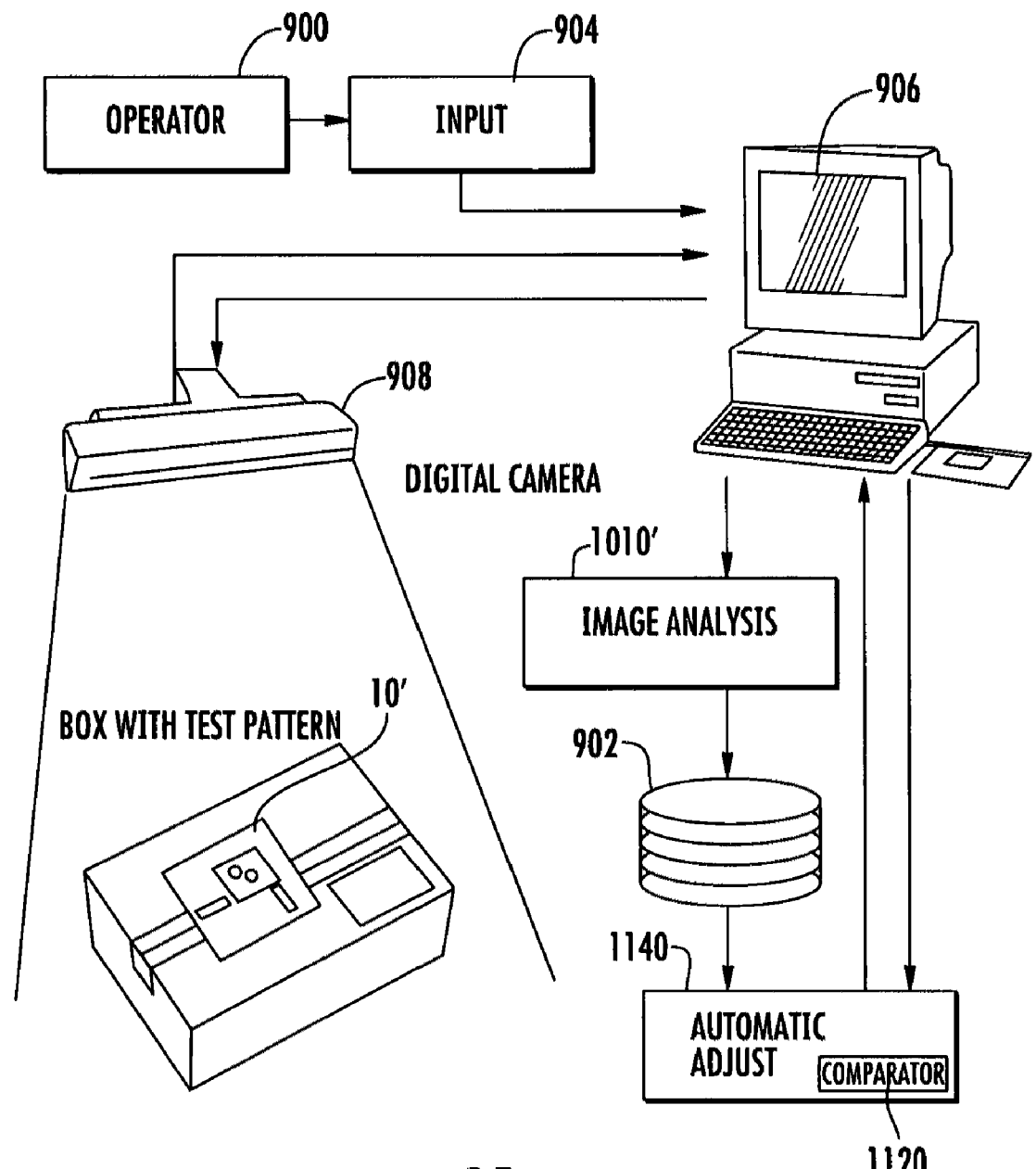
FIG. 25 is a schematic depiction of one example of the operation of the automated camera adjustment system in accordance with the present invention.

FIG. 25 is a diagram showing, in highly schematic form, the overall operation of a camera tunnel system when automatic adjustment system in accordance with one embodiment of the present invention is included. User or operator 900 of a camera tunnel system for example applies the test pattern 10' to an item or package. The package passes through the tunnel system, and an image of the test image is analyzed such as by image analysis tool 1010, FIG. 1C, in order to generate various image performance metrics 902. The image performance metrics can include the Common Properties (i.e., Illumination, Contrast, General Noise—including white and black General Noise) and the Horizontal and the Vertical Properties (i.e., resolution, focus, frequency noise—including white and black frequency noise), as set forth above. In addition to these metrics various environmental parameters can also be analyzed. As used herein, the environmental parameters can include shutter speed, focus length, size of diaphragm, and so on. The generated metrics and the various environmental parameters may then be saved to memory for further analysis. In one aspect, the memory can also store this data over time to have a history of stored data. Automatic adjustment module 1140 is configured to automatically adjust, e.g. camera settings, utilizing the information (metrics and environmental parameters) provided from the automated analysis of the test pattern. Thus, automatic adjustment module 1140 is also configured to be responsive to information and data including the foregoing metrics. Automatic adjustment module 1140 may also reference history sets of information to adjust the camera system, using one or more rules, some of which are described below.

In one variation, comparator subsystem or module 1120 is configured to compare various metrics from the image analysis to a history for such metrics stored in memory and/or to preset or predetermined values. Operator 900 may also monitor the adjustment results on a display screen of a computer, and provide inputs 904 to control the image quality that may get adjusted by the automated camera adjustment system to bring the performance to within a desired range.

Automatic adjustment module 1140 typically includes one or more rule-based algorithms, where one or more rules can be applied to adjust camera settings in order to adjust and optimize the image quality. The one or more rules may be used, for example, to adjust parameters such as illumination or gain and/or focus or focus distance. One rule for gain may be such that digital gain settings are lowered to decrease brightness or raised to increase brightness in response to an illumination value which is too high or low compared to a historical value or a desired, predetermined value. An illumination value corresponds to the brightness of the image obtained, and is controllable by the digital gain of the camera. One rule for the focus or focus distance may be such that a script is run to analyze multiple packages at various camera focus settings, or one package multiple times in an iterative process, and where the results are analyzed to zero in on a desired setting for focus. When the desired focus level is reached no further focus settings need be tested. In another example, camera focus parameters can be adjusted (up or down) between runs of the test target in order to identify the optimal settings.

In addition, the one or more rules can be combined to have a linear effect or they can be combined with individual weighing factors that are applied so as to weigh the relative contribution of each of the rules for camera parameters. Alternatively, the rules can be combined in an expert system where over time various weighing factors are adjusted to account for each system's unique setup. Although image analysis tool 1010', metrics 902, and automatic adjustment module 1140 are shown in FIG. 25 as separate from one another and separate from computer 906, this is not a limitation of the invention, and typically image analysis tool 1010' includes determined metrics 902 and automatic adjustment module 1140, which are typically part of and/or downloaded to and included in, e.g. computer 906. Also in one alternative configuration, image analysis tool 1010', computer 906, and/or camera 9078 make up or together are part of one integrated device.

In a further variation, image analysis tool 1010 may also include report generation subsystem or module 1130, such that the characteristics or metrics of analyzed test pattern image may be written to a user or computer-readable file.

Various parts or portions of the systems, subsystems, modules and methods of the subject invention may be embedded in software as may be known to those skilled in the art, and/or may be part of a computer or other processor which may be separate from the remaining systems. These examples are not meant to be limiting, and various parts or portions of the present invention may be implemented in a computer such as a digital computer, and/or incorporated in software module(s) and/or computer programs compatible with and/or embedded in computers or other conventional devices, and the computer's or device's main components may include e.g.: a processor or central processing unit (CPU), at least one input/output (I/O) device (such as a keyboard, a mouse, a compact disk (CD) drive, and the like), a controller, a display device, a storage device capable of reading and/or writing computer readable code, and a memory, all of which are interconnected, e.g., by a communications network or a bus. The systems, subsystems, modules and methods of the present invention can be implemented as a computer and/or software program (s) stored on a computer readable medium in a computer and/or on a computer readable medium such as a tape or compact disk. The systems, subsystems, modules and methods of the present invention can also be implemented in a plurality of computers or devices, with the components residing in close physical proximity or distributed over a large geographic region and connected by a communications network, for example.

The embodiments of the present invention can be used at many different phases of a camera tunnel system. For example, during the startup of a system, the image analysis system and method of the present invention can serve as a component of system acceptance and be used to ensure uniformity of setup and/or can be used during a live sort. Another use of the image analysis system and method of the present invention is to define a standard of image quality for various users of a camera tunnel system, such as for example a camera tunnel system supplied by the assignee herein. The definition of a standard of image quality that is enabled by the image analysis system and method of the present invention is especially useful for users of the camera tunnel system who use the camera tunnel images for advanced features such as Optical Character Recognition ("OCR") and telecoding, such as those provided by the assignee herein. In systems having such advanced features, the image analysis system and method of the present invention can be used to provide an objective measure of the camera tunnel's performance so as to minimize questions as to the etiology of camera tunnel system errors.

The image analysis system and method of the present invention, including the image analysis tool as described, provide an elegant method for measuring system image quality that gives objective measures of the performance of the camera tunnel system and ensures a consistent measurement and a performance criteria across many camera tunnel systems. The embodiments of the present invention also provide for the automated determination and measurement of quality of a camera tunnel system, which can be easily used by field technicians and site maintenance personnel, whereby the influence of an operator is minimized, thus ensuring consistency of measurement over time and across various tunnel systems.

As will be understood by those skilled in the art, other equivalent or alternative systems and methods for automated image performance analysis for a high speed camera for a camera tunnel system in accordance with the embodiments of the present invention can be envisioned without departing from the essential characteristics thereof. Accordingly, the foregoing disclosure is intended to be illustrative, but not limiting, of the scope of the invention which is set forth in the following claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A system for the automated analysis of image quality obtained by at least one camera in a camera tunnel system, comprising:
   a test pattern on an item for placement in the camera tunnel system;
   an imaging subsystem configured to capture an image of the item using the camera tunnel system, wherein the image includes an image of the test pattern; and
   an image analysis tool configured to:
      automatically identify the image of the test pattern; and
      automatically analyze the image of the test pattern and generate and display one or more image quality metrics.

2. The system of claim 1 wherein the one or more image quality metrics are selected from the group consisting of illumination, contrast, noise, resolution, focus and combinations thereof.

3. The system of claim 1 in which the image analysis tool is further configured to generate a printable version of the test pattern.

4. The system of claim 1 wherein said test pattern has an overall shape having a non-circular-shaped perimeter.

5. The system of claim 1 wherein said test pattern comprises a central contrast area having adjacently disposed dark and light areas defining a central location where the dark and light areas meet.

6. The system of claim 5 wherein the central contrast area is surrounded by one or more focus test areas, the focus test areas having a barcode-like pattern.

7. The system of claim 6 wherein the barcode-like pattern comprises bar codes arranged in a gradually varying resolution.

8. The system of claim 7 wherein the focus test areas having a barcode-like pattern surround the perimeter of the central contrast area such that each focus test area's bar codes are substantially perpendicular to its adjacent focus test area's bar codes.

9. The system of claim 8 wherein the focus test areas have a first side and a second side where the first side is adjacent to the central contrast area, and the second side is adjacent to a machine-readable scale.

10. The system of claim 9 wherein the machine readable scale comprises alternately arranged dark and light portions.

11. The system of claim 1 in which the image analysis tool is further configured to compare the one or more image quality metrics with a predetermined threshold value for said one or more image quality metrics to form a comparison.

12. The system of claim 11 in which the image analysis tool is further configured to automatically adjust an image quality setting of the at least one camera to bring the camera's performance to within a desired range.

13. The system of claim 1 further including a decoder subsystem configured to read a symbol and wherein the item includes a symbol.

14. The system of claim 13 in which the decoder subsystem generates a signal and the image analysis tool is configured to be responsive to the signal and to save the image of the test pattern in memory.

15. The system of claim 14 in which the image analysis tool is further configured to commence identifying and analyzing the saved image of the test pattern.

16. The system of claim 1 in which the item is a package.

17. The system of claim 1 further including a report generation subsystem for writing the one or more image quality metrics to a file.

18. A method for the automated analysis of image quality obtained by at least one camera in a camera tunnel system, comprising:
   a test pattern on an item for placement in the camera tunnel system;
   capturing an image of the item using the camera tunnel system, wherein the image includes an image of the test pattern;
   identifying the image of the test pattern automatically; and
   automatically analyzing the image of the test pattern and generating and displaying one or more image quality metrics.

19. The method of claim 18 wherein the one or more image quality metrics are selected from the group consisting of illumination, contrast, noise, resolution, focus and combinations thereof.

20. The method of claim 18 further including generating a printable version of the test pattern.

21. The method of claim 18 wherein said test pattern has an overall shape having a non-circular-shaped perimeter.

22. The method of claim 18 wherein said test pattern comprises a central contrast area having adjacently disposed dark and light areas defining a central location where the dark and light areas meet.

23. The method of claim 22 wherein the central contrast area is surrounded by one or more focus test areas, the focus test areas having a barcode-like pattern.

24. The method of claim 23 wherein the barcode-like pattern comprises bar codes arranged in a gradually varying resolution.

25. The method of claim 24 wherein the focus test areas having a barcode-like pattern surround the perimeter of the central contrast area such that each focus test area's bar codes are substantially perpendicular to its adjacent focus test area's bar codes.

26. The method of claim 25 wherein the focus test areas have a first side and a second side where the first side is adjacent to the central contrast area, and the second side is adjacent to a machine-readable scale.

27. The method of claim 26 wherein the machine readable scale comprises alternately arranged dark and light portions.

28. The method of claim 18 further including comparing the one or more image quality metrics with a predetermined threshold values for said one or more image quality metrics.

29. The method of claim 28 further including automatically adjusting an image quality setting of the at least one camera to bring the camera's performance to within a desired range.

30. The method of claim 18 wherein the item includes a symbol thereon.

31. The method of claim 30 further including reading the symbol on the item.

32. The method of claim 31 further including saving the image of the test pattern in memory.

33. The method of claim 32 including identifying and analyzing the saved image of the test pattern.

34. The method of claim 18 in which the item is a package.

35. The method of claim 18 further including generating a report of the one or more image quality metrics to a file.

36. A system for the automated analysis of image quality obtained by at least one camera in a camera tunnel system, comprising:
  a test pattern on an item for placement in the camera tunnel system;
  an imaging subsystem configured to capture an image of the item using the camera tunnel system, wherein the image includes an image of the test pattern; and
  an image analysis tool configured to:
    automatically identify the image of the test pattern;
    automatically analyze the image of the test pattern for generating one or more image quality metrics; and
    generate a printable version of the test pattern.

37. A system for the automated analysis of image quality obtained by at least one camera in a camera tunnel system, comprising:
  a test pattern on an item for placement in the camera tunnel system, said test pattern comprising a central contrast area having adjacently disposed dark and light areas defining a central location where the dark and light areas meet;
  an imaging subsystem configured to capture an image of the item using the camera tunnel system, wherein the image includes an image of the test pattern; and
  an image analysis tool configured to:
    automatically identify the image of the test pattern; and
    automatically analyze the image of the test pattern for generating one or more image quality metrics.

38. A system for the automated analysis of image quality obtained by at least one camera in a camera tunnel system, comprising: a test pattern on an item for placement in the camera tunnel system, said test pattern comprising a central contrast area having adjacently disposed dark and light areas defining a central location where the dark and light areas meet.

39. The system of claim 38 wherein the test pattern central contrast area is surrounded by one or more focus test areas, the focus test areas having a barcode-like pattern.

40. The system of claim 38 wherein the test pattern includes a barcode-like pattern comprising bar codes arranged in a gradually varying resolution.

41. The system of claim 40 wherein the test pattern includes focus test areas having a barcode-like pattern surrounding the perimeter of the central contrast area such that each focus test area's bar codes are substantially perpendicular to its adjacent focus test area's bar codes.

42. The system of claim 40 wherein the test pattern includes focus test areas having a first side and a second side where the first side is adjacent to the central contrast area, and the second side is adjacent to a machine-readable scale.

43. The system of claim 40 wherein the test pattern includes a machine readable scale comprising alternately arranged dark and light portions.

* * * * *